US007260719B1

(12) United States Patent
Asano et al.

(10) Patent No.: US 7,260,719 B1
(45) Date of Patent: Aug. 21, 2007

(54) INFORMATION PROCESSING SYSTEM, INFORMATION PROCESSING METHOD, AND INFORMATION PROCESSING DEVICE

(75) Inventors: Tomoyuki Asano, Kanagawa (JP); Yoshitomo Osawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/719,460

(22) PCT Filed: Apr. 11, 2000

(86) PCT No.: PCT/JP00/02353

§ 371 (c)(1), (2), (4) Date: Dec. 11, 2000

(87) PCT Pub. No.: WO00/62475

PCT Pub. Date: Oct. 19, 2000

(30) Foreign Application Priority Data

Apr. 13, 1999 (JP) ................................ 11-105966
May 24, 1999 (JP) ................................ 11-143988

(51) Int. Cl.
*H04L 9/00* (2006.01)

(52) U.S. Cl. ...................... 713/169; 713/168; 713/170; 713/171; 380/200

(58) Field of Classification Search ................ 713/155, 713/165, 168–169, 170–171, 200–201; 380/205, 380/229, 232, 200
See application file for complete search history.

(56) References Cited

U.S. PATENT DOCUMENTS 5,412,730 A * 5/1995 Jones .......................... 380/46
(Continued)

FOREIGN PATENT DOCUMENTS

EP 0 848 568 6/1998

(Continued)

OTHER PUBLICATIONS

Romans C et al: "A medium access protocol for wireless LANs which supports isochronous and asynchronous traffic" Personal, Indoor and Mobile Radio Communications, 1998. The Ninth IEEE International Symposium on Boston, MA, USA Sep. 8-11, 1998, New York, NY, USA,IEEE,US, Sep. 8, 1998, pp. 147-152, XP010314731 ISBN: 0-7803-4872-9.

Schneier B: "Key-exchange algorithms", Applied Cryptography. Protocols, Algorithms, and Source Code in C, New York, John Wiley & Sons, US, pp. 513-514 XP002137487 ISBN: 0-471-11709-9.

(Continued)

*Primary Examiner*—Kambiz Zand
*Assistant Examiner*—Tongoc Tran
(74) *Attorney, Agent, or Firm*—Finnegan, Henderson, Farabow, Garrett & Dunner, L.L.P.

(57) ABSTRACT

Prior to data transmission, a protocol for performing mutual authentication and sharing a plurality of encryption keys is executed between a CPU 12 on the side of a data transmission apparatus 10 and a CPU 22 on the side of a data receiving apparatus 20. The data transmission apparatus 10 causes the CPU 12 to encrypt data requiring the assurance of a transmission band by a first encryption key and to transmit the data in a first transmission mode via an input/output interface 16, and also to encrypt related data relating to the data by a second encryption key and to transmit the related data in a second transmission mode via the input/output interface 16. The data receiving apparatus 20 causes the CPU 22 to decode, by a first encryption key, the data requiring the assurance of a transmission band received in the first transmission mode via an input/output interface 24, and also to decode, by a second encryption key, the related data received in the second transmission mode via the input/output interface 24.

64 Claims, 16 Drawing Sheets

U.S. PATENT DOCUMENTS

| | | | | |
|---|---|---|---|---|
| 5,689,566 A * | 11/1997 | Nguyen | ...................... | 713/155 |
| 5,825,890 A * | 10/1998 | Elgamal et al. | ............. | 713/151 |
| 5,987,126 A * | 11/1999 | Okuyama et al. | ........... | 380/203 |
| 6,542,610 B2 * | 4/2003 | Traw et al. | ................. | 380/262 |
| 2001/0043731 A1 * | 11/2001 | Ito et al. | ..................... | 382/132 |

FOREIGN PATENT DOCUMENTS

| | | |
|---|---|---|
| EP | 0 874 503 | 10/1998 |
| JP | 07-264668 | 10/1995 |
| JP | 09-74408 | 3/1997 |
| JP | 10-21645 | 1/1998 |
| JP | 10-51439 | 2/1998 |
| JP | 10-210023 | 8/1998 |
| JP | 10-224402 | 8/1998 |
| JP | 10-224763 | 8/1998 |
| JP | 10-303945 | 11/1998 |
| JP | 11-27315 | 1/1999 |
| JP | 11-53264 | 2/1999 |

OTHER PUBLICATIONS

Kelsey J et al: "An authenticated camera" Computer Security Applications Conference, 1996., 12th Annual San Diego, CA, USA Dec. 9-13, 1996, Los Alamitos, CA, USA, IEEE Comput. Soc, US, Dec. 9, 1996, pp. 24-30, XP010213038 ISBN: 0-8186-7606-X.

Bruce Schneier: "Applied Cryptography", Applied Cryptography. Protocols, Algorithms, and Source Code in C, New York, NY: John Wiley & Sons, US, pp. 461-502 XP002128601 ISBN: 0-471-11709-9.

IEEE 1394 High-speed Serial Bus for Video Conferencing System, Masanori Suzuki et al., vol. 96, No. 12, pp. 215 to 220, Jan. 26, 1996.

IEEE Globecom;Security for Information Data Broadcasting System with Conditional-Access Control, Hideki Tsubakiyama et al., pp. 164 to 170.

* cited by examiner

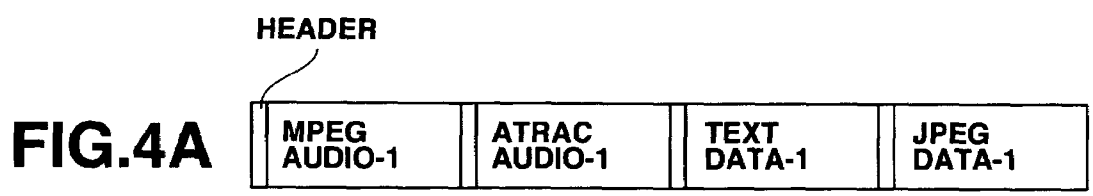
FIG.4B
MPEG AUDIO-2 | ATRAC AUDIO-2 | TEXT DATA-2 | JPEG DATA-2
FIG.4C
MPEG AUDIO-3 | ATRAC AUDIO-3 | TEXT DATA-3 | JPEG DATA-3
FIG.4D
MPEG AUDIO-4 | ATRAC AUDIO-4 | TEXT DATA-4 | JPEG DATA-4
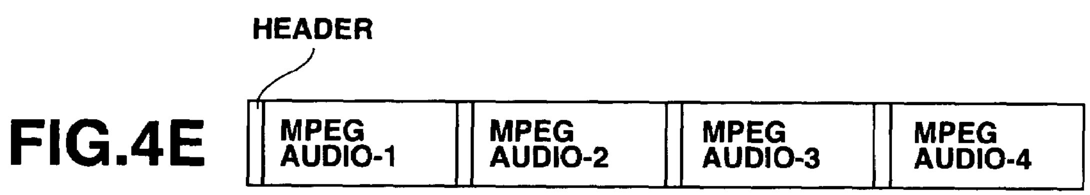
FIG.4F
ATRAC AUDIO-1 | ATRAC AUDIO-2 | ATRAC AUDIO-3 | ATRAC AUDIO-4
FIG.4G
TEXT DATA-1 | TEXT DATA-2 | TEXT DATA-3 | TEXT DATA-4
FIG.4H
JPEG DATA-1 | JPEG DATA-2 | JPEG DATA-3 | JPEG DATA-4

FIG.7A DATA SIGNAL (TPBout-TPAin)

FIG.7B STROBE SIGNAL (TPAout-TPBin)

FIG.7C TRANSMISSION CLOCK (Data^Strobe)

INFORMATION PROCESSING SYSTEM, INFORMATION PROCESSING METHOD, AND INFORMATION PROCESSING DEVICE

TECHNICAL FIELD

This invention relates to an information processing system, an information processing method and an information processing apparatus for carrying out transmission of data via an interface having a first transmission mode in which a transmission band is ensured and a second transmission mode in which a transmission band is not ensured.

BACKGROUND ART

Recently, for example, systems in which a plurality of AV apparatuses are connected via a digital interface at homes for transmitting and recording digital data such as music information, video information or the like are becoming popular.

For example, in an apparatus such as a video camera, a DVD player or the like having an interface of the IEEE (Institute of Electrical and Electronics Engineers) 1394 high-performance serial bus (hereinafter simply referred to as the IEEE 1394 serial bus), since data can be recorded with high fidelity, it is necessary to prevent data from being illegally copied.

For example, a key is stored indicating whether or not recording of movie information onto a magneto-optical disc apparatus is permitted, and by using this key, authentication is performed as to whether the magneto-optical disc apparatus is an authorized apparatus, that is, an apparatus which has received a license from the copyright holder. Thus, recording of the movie information onto only a magneto-optical disc apparatus which is authenticated as an authorized unit is permitted. In such a case, it is necessary to perform authentication of the counterpart apparatus between an apparatus on the side which transmits movie information (hereinafter referred to as a source) and an apparatus on the side which receives the transmission (hereinafter referred to as a sink).

For the purpose of protecting copyright in such a system, various authentication methods have been proposed. For an authentication protocol used for these authentication methods, an encryption algorithm is often used.

Meanwhile, when transmitting music data between apparatuses, for example, if transmission is stopped during the transmission of the music data or if the quantity of data which can be transmitted is extremely reduced, it becomes impossible for the receiving side to obtain data required for playback and the music might be interrupted. Therefore, it is necessary to transmit music data in a state where a band of a certain extent is secured.

On the other hand, when transmitting information which is not music data itself but is related to music data, for example, lyrics, a photograph of an artist or the like, the real-time property is not required in comparison with the case of transmitting the music data itself. Therefore, it is possible to transmit the information by using a transmission method in which a transmission band is not secured. In general, it is often desired to use the transmission method in which a transmission band is not secured, because the band of the entire transmission line is not used.

DISCLOSURE OF THE INVENTION

Thus, in view of the foregoing status of the art, it is an object of the present invention to provide an information processing system, an information processing method and an information processing apparatus in which two types of transmission modes, that is, a transmission mode in which a transmission band is secured and a transmission mode in which a transmission band is not secured, are employed so as to enable reliable transmission of data.

It is another object of the present invention to provide an information processing system, an information processing method and an information processing apparatus in which data requiring the assurance of a transmission band and related data relating to the data are encrypted by different encryption keys so as to enable safe transmission.

It is a further object of the present invention to provide an information processing system, an information processing method and an information processing apparatus which enable authentication of an information processing apparatus on a transmission side and an information processing apparatus on a receiving side with respect to each other and which enable sharing of an encryption key.

An information processing system according to the present invention comprises: a first information processing apparatus comprising an interface having a first transmission mode in which a transmission band is ensured and a second transmission mode in which a transmission band is not ensured, and transmission control means for encrypting data requiring the assurance of the transmission band by a first encryption key and then transmitting the data in the first transmission mode via the interface and for encrypting related data relating to the data by a second encryption key and then transmitting the related data in the second transmission mode via the interface; and a second information processing apparatus comprising an interface having a first transmission mode in which a transmission band is ensured and a second transmission mode in which a transmission band is not ensured, and receiving control means for decoding, by the first encryption key, the data requiring the assurance of the transmission band which is received in the first transmission mode via the interface and for decoding, by the second encryption key, the related data received in the second transmission mode via the interface.

An information processing method according to the present invention is adapted for performing data transmission between a first information processing apparatus and a second information processing apparatus via an interface having a first transmission mode in which a transmission band is ensured and a second transmission mode in which a transmission band is not ensured. The method comprises the steps of: encrypting data requiring the assurance of the transmission band from the first information processing apparatus by a first encryption key and then transmitting the data in the first transmission mode, while encrypting related data relating to the data by a second encryption key and then transmitting the related data in the second transmission mode; and decoding, by the first encryption key on the side of the second information processing apparatus, the data requiring the assurance of the transmission band which is received in the first transmission mode, and decoding, by the second encryption key, the related data received in the second transmission.

Also, an information processing apparatus according to the present invention comprises: an interface having a first transmission mode in which a transmission band is ensured and a second transmission mode in which a transmission band is not ensured; and transmission control means for encrypting data requiring the assurance of the transmission band by a first encryption key and then transmitting the data in the first transmission mode via the interface and for encrypting related data relating to the data by a second encryption key and then transmitting the related data in the second transmission mode via the interface.

Also, an information processing apparatus according to the present invention comprises: an interface having a first transmission mode in which a transmission band is ensured and a second transmission mode in which a transmission band is not ensured; and receiving control means for decoding, by a first encryption key, the data requiring the assurance of the transmission band which is received in the first transmission mode via the interface and for decoding, by a second encryption key, the related data received in the second transmission mode via the interface.

BRIEF DESCRIPTION OF THE DRAWINGS

FIGS. 4A to 4H are explanatory views showing the time-division multiplexing structure of transmission data.

BEST MODE FOR CARRYING OUT THE INVENTION

Preferred embodiments of the present invention will now be described with reference to the drawings.

The present invention is applicable to a data transmission system (AV system) in which electronic apparatuses such as various types of digital AV (audio-visual) apparatuses, personal computer units and the like are interconnected via, for example, the IEEE (Institute of Electrical and Electronics Engineers) 1394 bus so that data can be transmitted and received among the apparatuses. In this AV system, a construction is adopted which enables reception of digital satellite broadcast and downloading of the received data.

Figure 1:
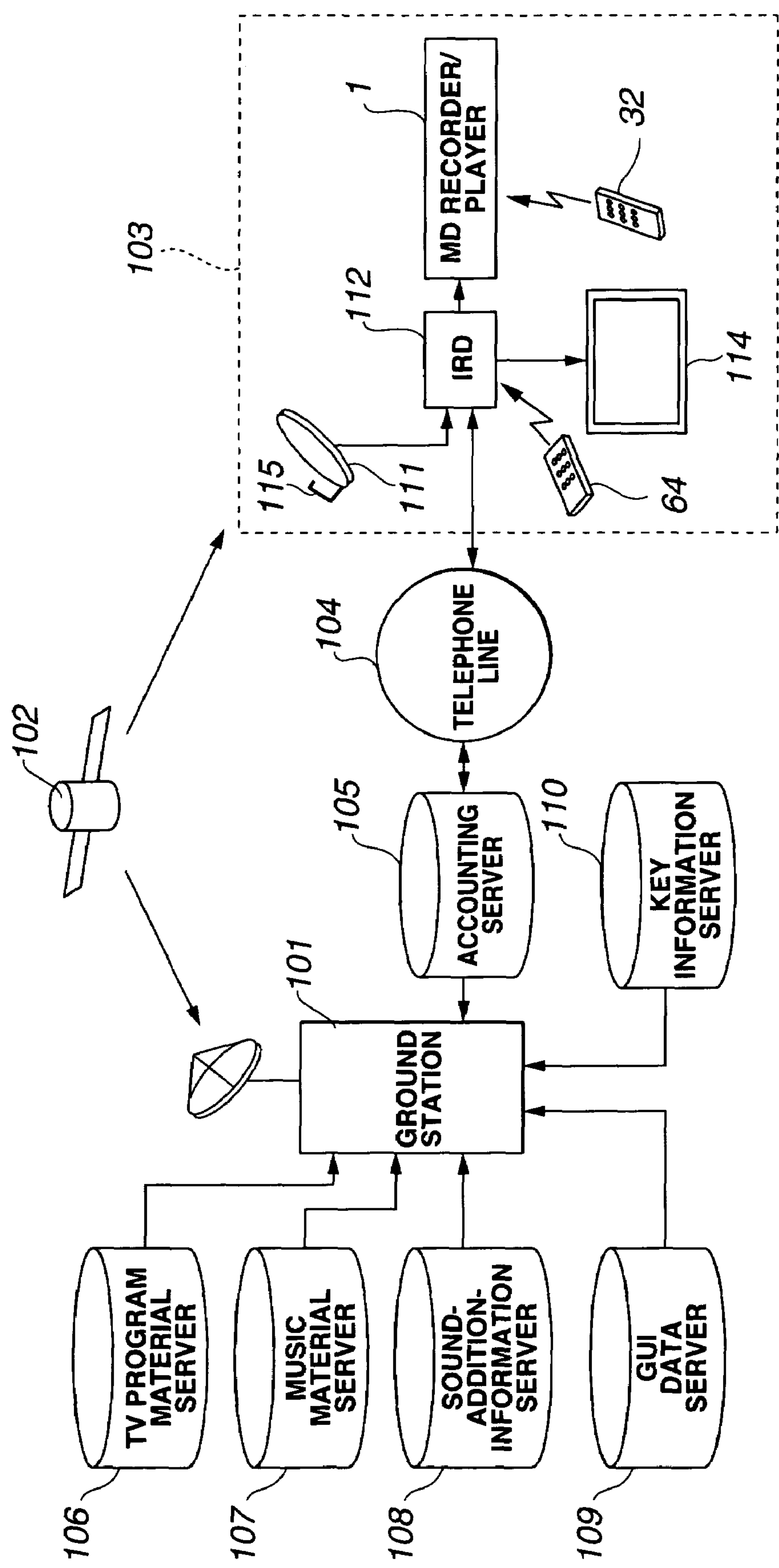
FIG. 1 is a block diagram showing the overall construction of a digital satellite broadcast system including an AV system to which the present invention is applied.

The overall construction of the digital satellite broadcast system including this AV system is shown in FIG. 1.

In the digital satellite broadcast system shown in FIG. 1, materials for television program broadcast from a TV program material server 106, materials for music data from a music material server 107, sound addition information from a sound-addition-information server 108, and GUI (graphical user interface) data from a GUI data server 109 are sent to a ground station 101 for digital satellite broadcast.

The TV program material server 106 is a server for providing materials for a normal broadcast program. Materials for music broadcast sent from the TV program material server are contain dynamic images and sounds. For example, if the program is a music broadcast program, dynamic images and sounds for promotion of a new music piece are broadcast by using the materials of the dynamic images and sounds of the TV program material server 106.

The music material server 107 is a server for providing an audio program by using an audio channel. Materials for this audio program consist of sounds only. The music material server 107 transmits the materials of the audio program of a plurality of audio channels to the ground station 101.

In program broadcast of each audio channel, the same music piece is broadcast repeatedly for a predetermined unit time. Each of the audio channels is independent of the others and various methods can be conceived for the use thereof. For example, in one audio channel, several pieces of the latest Japanese pop music are repeatedly broadcast for a particular fixed time period, and in another channel, several pieces of the latest pop music abroad are repeatedly broadcast for a particular fixed time period.

The sound-addition-information server 108 is a server for providing time information or the like of a music piece outputted from the music material server 107.

The GUI data server 109 provides "GUI data" for forming a GUI screen used by a user for an operation. For example, if the screen is a GUI screen for downloading a music piece, as will be later described, the GUI data server 109 provides image data for forming a page of a list of music pieces to be distributed and an information page for each music piece, text data, and a still picture of the album jacket. Furthermore, EPG (electrical program guide) data used to display a program list, which is called EPG, on the AV system 103 side is also provided from here.

For the "GUI data", for example, an MHEG (Multimedia Hypermedia Information Coding Experts Group) system is employed. MHEG is an international standard for description of a scenario, for recognizing multimedia information, procedure, operation and the combination thereof as objects, then coding these objects, and producing a title (e.g., GUI screen). In this digital satellite broadcast system, MHEG-5 is employed.

The ground station 101 multiplexes the information transmitted from the TV program material server 106, the music material server 107, the sound-addition-information server 108 and the GUI data server 109, and transmits it.

In this digital satellite broadcast system, the video data transmitted from the TV program material server 106 is compressed and coded by the MPEG (Moving Picture Experts Group) 2 system, and audio data is compressed and coded by the MPEG2 audio system. The audio data transmitted from the music material server 107 is compressed and coded, for example, by either the MPEG2 audio system or the ATRAC (Adaptive Transform Acoustic Coding) system, corresponding to each audio channel.

In multiplexing these data, the data are encrypted by using key information from a key information server 110.

A signal from the ground station 101 is received by a receiving equipment (hereinafter also referred to as AV system) 103 at each home via a satellite 102. A plurality of transponders are mounted in the satellite 102. One transponder has a transmission capability of, for example, 30 Mbps. The AV system 103 of each home has an IRD (integrated receiver decoder) 112 connected to a parabolic antenna 111, and also has a monitor unit 114 and an MD recorder/player 1 which are connected to the IRD 112. The AV system 103 also has a remote controller 64 for performing an operation in the IRD 112, and a remote controller 32 for performing an operation in the MD recorder/player 1.

In this AV system 103, a signal which is broadcasted via the satellite 102 is received by the parabolic antenna 111. This received signal is converted to a predetermined frequency by an LNB (low noise block down-converter) 115 mounted in the parabolic antenna 111 and is supplied to the IRD 112.

As a basic operation in the IRD 112, a signal of a predetermined channel is selected from the received signal, demodulation of video data and audio data as a program is performed from the channel-selected signal, and the resulting signals are outputted as a video signal and an audio signal. Also, in the IRD 112, output as a GUI screen is performed on the basis of the GUI data which is multiplexed and transmitted together with data as a program. Such output of the IRD 112 is supplied to, for example, the monitor unit 114. Thus, in the monitor unit 114, display of the image and output of the sound of the program which is received and channel-selected by the IRD 112 are performed, and it becomes possible to display the GUI screen in accordance with the operation by the user.

The MD recorder/player 1 is a recording and playback apparatus capable of recording audio data onto and play back audio data from a loaded mini-disc. Also, this MD recorder/player 1 is capable of recording audio data (music data) and still image data (picture file) such as an album jacket associated with the audio data, and text data (text file) such as lyrics, liner notes and the like onto a disc, and is capable of playing back and outputting the recorded data of the picture file, the text file and the like in synchronization with the playback time of the audio data.

The data of the picture file, the text file and the like appended to the audio data is also called "AUX data" as a matter of convenience in accordance with the handling in the MD recorder/player 1, as will be described later.

In the AV system 103, it is assumed that the IRD 112 and the MD recorder/player 1 are interconnected by an IEEE 1394 bus 116.

In short, each of the IRD 112 and the MD recorder/player 1 constituting the AV system 103 has a data interface conforming to the IEEE 1394 standard as the data transmission standard.

Thus, in this AV system, the audio data (downloaded data) as a music piece received by the IRD 112 can be directly inputted and recorded as it remains compressed by the ATRAC system. Also, the AUX data uploaded together with the audio data to the satellite from the transmission side can be downloaded and recorded onto the MD recorder via the IRD 112 from the satellite.

The IRD 112 is capable of communicating with an accounting server 105 via a telephone line 104. An IC card on which various types of information is stored is inserted into the IRD 112. Then, for example, if audio data of a music piece is downloaded, history information regarding this is stored onto the IC card. The information on this IC card is sent to the accounting server 105 at a predetermined opportunity and timing via the telephone line 104. The accounting server 105 performs accounting by setting the amount in accordance with the received history information and thus charges the user.

As can be understood from the foregoing description, in the digital satellite broadcast system including the AV system to which the present invention is applied, the ground station 101 multiplexes the video data and audio data, which are materials for music program broadcast from the TV program material server 106, the audio data, which are materials for the audio channel from the music material server 107, the sound data from the sound-addition-information server 108, and the GUI data from the GUI data server 109, and then transmits the multiplexed data.

When this broadcast is received by the AV system 103 at each home, it is possible to view the program of the selected channel, for example, by using the monitor unit 114. Also, as the GUI screen using the GUI data transmitted together with the data of the program, an EPG (electrical program guide) screen may be displayed so that retrieval of a program or the like can be performed. By performing a required operation using the GUI screen for specific services other than the normal program broadcast, services other than viewing of a normal program provided in the broadcast system can be enjoyed.

For example, if the GUI screen for the downloading service of audio (music piece) data is displayed and an operation is performed using this GUI screen, it is possible to download the audio data of the music piece requested by the user and to record and save it onto a disc by using the MDC recorder/player 1.

In this digital satellite broadcast system, when performing transmission from the ground station 101 to the AV system 103 via the satellite 102, the DSM-CC (Digital Storage Media-Command and Control) protocol is employed.

The DSM-CC (MPEG-part6) system, as is already known, defines commands and a control method for retrieving an MPEG coded bit stream stored on a digital storage medium (DSM) or storing a stream on a DSM via a certain network.

In order to transmit contents (a set of objects) of a data broadcast service (e.g., the GUI screen) by the DSM-CC system, it is necessary to define the description format of the contents in advance. In this digital satellite broadcast system, the above-described MHEG is employed as the definition of the description format of the contents.

Figure 2:
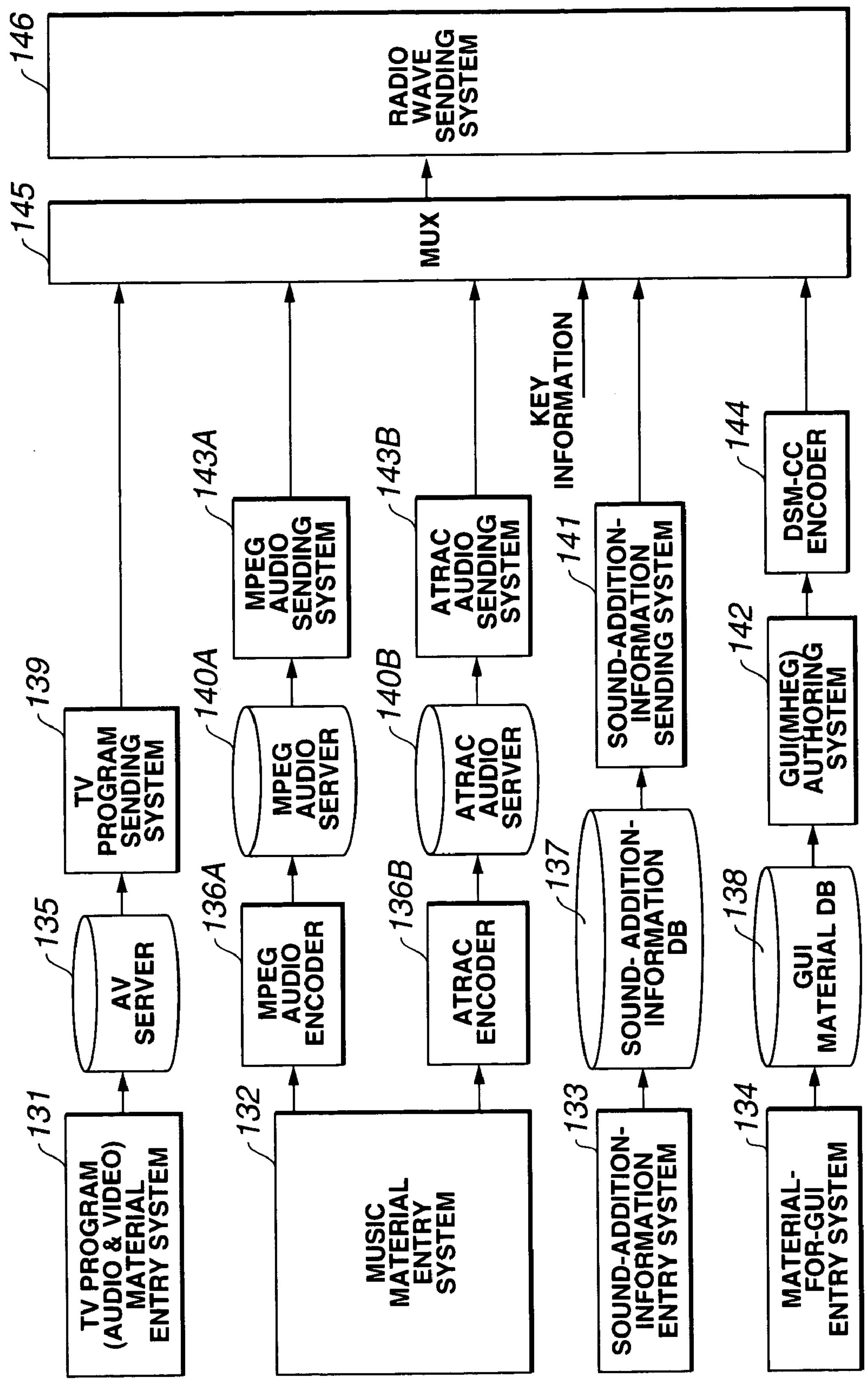
FIG. 2 is a block diagram showing the construction of a ground station in the digital satellite broadcast system.

The ground station 101 in this digital satellite broadcast system is constituted as shown in FIG. 2.

In the ground station 101 shown in FIG. 2, a TV program material entry system 131 registers the material data obtained from the TV program material server 106 to an AV server 135. The material data is sent to a TV program sending system 139, whereby the video data is compressed, for example, in accordance with the MPEG2 system, and whereby the audio data is divided into packets, for example, in accordance with the MPEG2 audio system. The output of the TV program sending system 139 is sent to a multiplexer 145.

In a music material entry system 132, the material data from the music material server 107, that is, the audio data, is supplied to an MPEG2 audio encoder 136A and an ATRAC encoder 136B. The MPEG2 audio encoder 136A and the ATRAC encoder 136B perform encoding processing (compression coding) on the supplied audio data and then register the encoded audio data to an MPEG audio server 140A and an ATRAC audio server 140B, respectively.

The MPEG audio data registered to the MPEG audio server 140A is transmitted to an MPEG audio sending system 143A, whereby the data is divided into packets and then transmitted to the multiplexer 145. The ATRAC data registered to the ATRAC audio server 140B is sent as 4×-speed ATRAC data to an ATRAC audio sending system 143B, whereby the data is divided into packets and sent to the multiplexer 145.

In a sound-addition-information entry system 133, the sound addition information, which is the material data from the sound-addition-information server 108, is registered to a sound-addition-information database 137. The sound addition information registered to the sound-addition-information database 137 is transmitted to a sound-addition-information sending system 141, whereby the information is similarly divided into packets and transmitted to the multiplexer 145.

In a material-for-GUI entry system 134, the GUI data, which is the material data from the GUI data server 109, is registered to a GUI material database 138.

The GUI material data registered to the GUI material database 138 is transmitted to a GUI authoring system 142, whereby processing is performed so that the data is converted into a data format that can be outputted as a GUI screen.

Specifically, for example, in the case of a GUI screen for downloading a music piece, the data transmitted to the GUI authoring system 142 may be still image data of the album jacket, text data such as lyrics, and sound data that should be outputted in accordance with the operation.

Each of the above-described data is so-called monomedia. In the GUI authoring system 142, the monomedia data is coded by using an MHEG authoring tool and the coded monomedia data is handled as an object.

Then, the contents of MHEG-5 are produced together with a scenario description file (script) which defines the relation of the above-mentioned objects so that a display mode of the GUI screen and an output mode of an image and sound corresponding to the operation can be obtained.

Image and sound data (MPEG video data and MPEG audio data) based on the material data of the TV program material server 106, and MPEG audio data based on the music material data of the music material server 107 are also displayed on the GUI screen, and an output mode corresponding to the operation is provided.

Therefore, as the above-mentioned scenario description file, the GUI authoring system 142 handles, as objects, the image and sound data based on the material data of the TV program material server 106, the MPEG audio data based on the music material data of the music material server 107, and the sound addition information from the sound-addition-information server 108, if necessary, and performs prescription by the script of MHEG.

The data of the MHEG contents transmitted from the GUI authoring system 142 includes a script file, a data file of various types of still images as objects, and a text data file. The still image data is data of 640×480 pixels compressed, for example, in accordance with the JPEG (Joint Photographic Experts Group) system, and the text data is a file of, for example, not more than 800 characters.

The data of the MHEG contents obtained by the GUI authoring system 142 is transmitted to a DSM-CC encoder 144.

In the DSM-CC encoder 144, the data is converted into a transport stream (hereinafter also abbreviated as TS (transport stream)) of a format that can be multiplexed into a data stream of video and audio data in accordance with the MPEG2 format, and then is divided into packets, which are outputted to the multiplexer 145.

In the multiplexer 145, the video packets and audio packets from the TV program sending system 139, the audio packets from the MPEG audio sending system 143A, the 4×-speed audio packets from the ATRAC audio sending system 143B, the sound-addition-information packets from the sound-addition-information sending system 141, and the GUI data packets from the GUI authoring system 142 are multiplexed on the time base and are encrypted in accordance with the key information output from the key information server 110.

The output of the multiplexer 145 is transmitted to a radio wave sending system 146, whereby processing such as addition of an error correcting code, modulation, and frequency conversion is performed thereon and then the resulting data is transmitted from the antenna toward the satellite 102.

Figure 3:
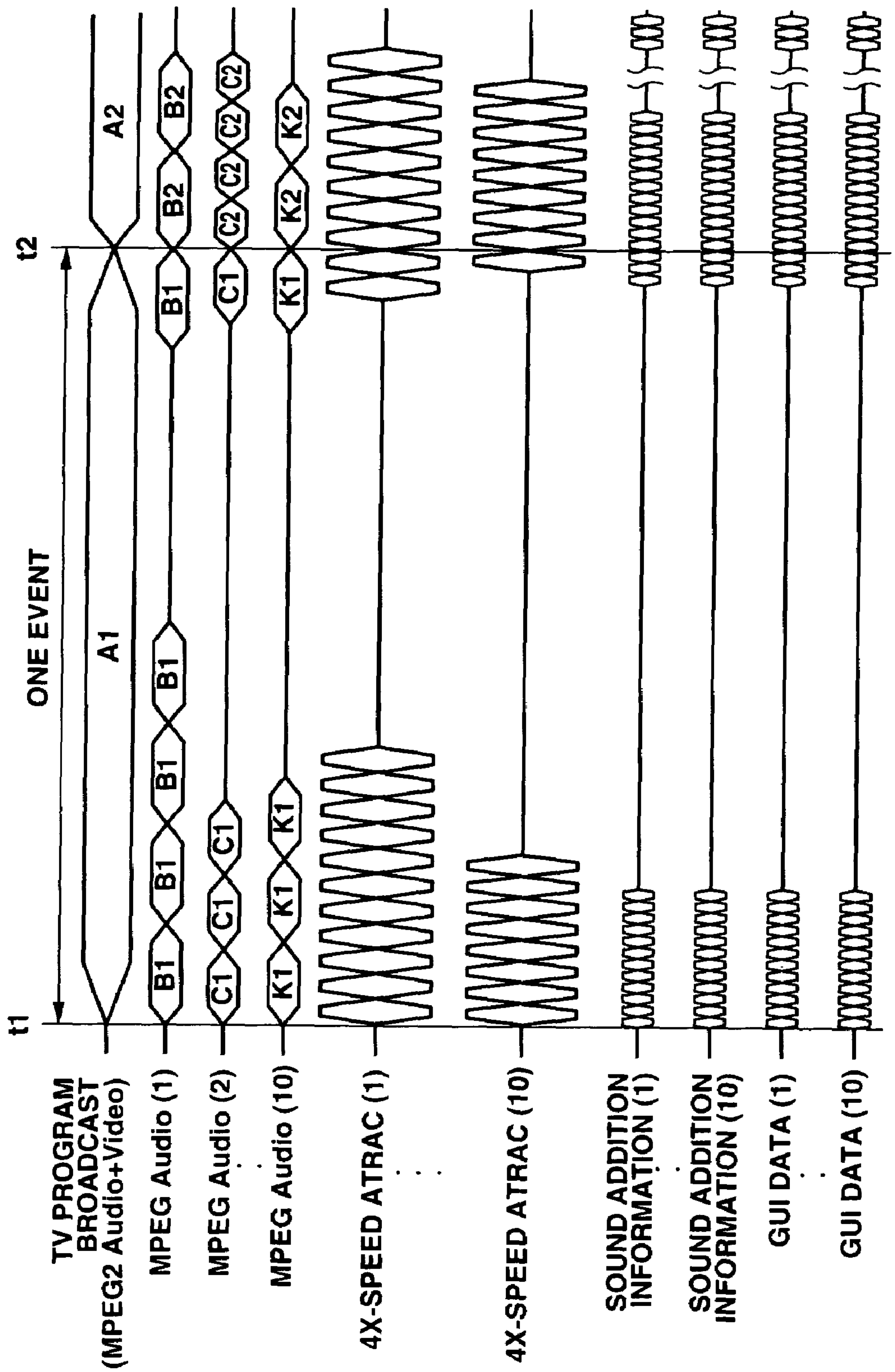
FIG. 3 is a view showing data transmitted from the ground station.

FIG. 3 shows an example of data in transmitting and outputting it from the ground station 101 to the satellite 102. Each of the data shown in FIG. 3 is multiplexed on the time base in practice. Each of the data is constituted so that, as shown in FIG. 3, the part from a time point t1 to a time point t2 is one event and the part from a time point t2 is the next event. The event referred to herein is a unit for changing the lineup of a plurality of music pieces and has a duration of 30 minutes or about one hour, if in the case of a channel of a music program.

As shown in FIG. 3, a program of normal program broadcast of dynamic images having predetermined contents A1 is broadcast in the event from the time point t1 to the time point t2. In the event starting at the time point t2, a program having contents A2 is broadcast. The contents of the broadcast in this normal program are dynamic images and sounds.

As MPEG audio channels (1) to (10), for example, 10 channels of channels CH1 to CH10 are prepared. In this case, in each of the audio channels CH1, CH2, CH3, . . . , CH10, the same music piece is repeatedly transmitted during the broadcast of one event. That is, in the period of the event from the time point t1 to the time point t2, a music piece B1 is repeatedly transmitted in the audio channel CH1, a music piece C1 is repeatedly transmitted in the audio channel CH2, and similarly, a music piece K1 is repeatedly transmitted in the audio channel CH10. This is common to the 4×-speed ATRAC audio channels (1) to (10) shown therebelow.

In other words, in FIG. 3, the same music piece is broadcast in the MPEG audio channel and the 4×-speed ATRAC audio channel having the same channel number in ( ). Also, the numerals in ( ), which are the channel numbers of the sound addition information, are sound addition information added to the audio data having the same cannel numbers. In addition, the still image data and text data transmitted as the GUI data are formed for each channel. These data are time-division multiplexed within the MPEG2 transport packet and then transmitted, as shown in FIGS. 4A to 4D, and reconstructed by using the header information of each packet inside the IRD 112, as shown in FIGS. 4E to 4H.

Figure 5:
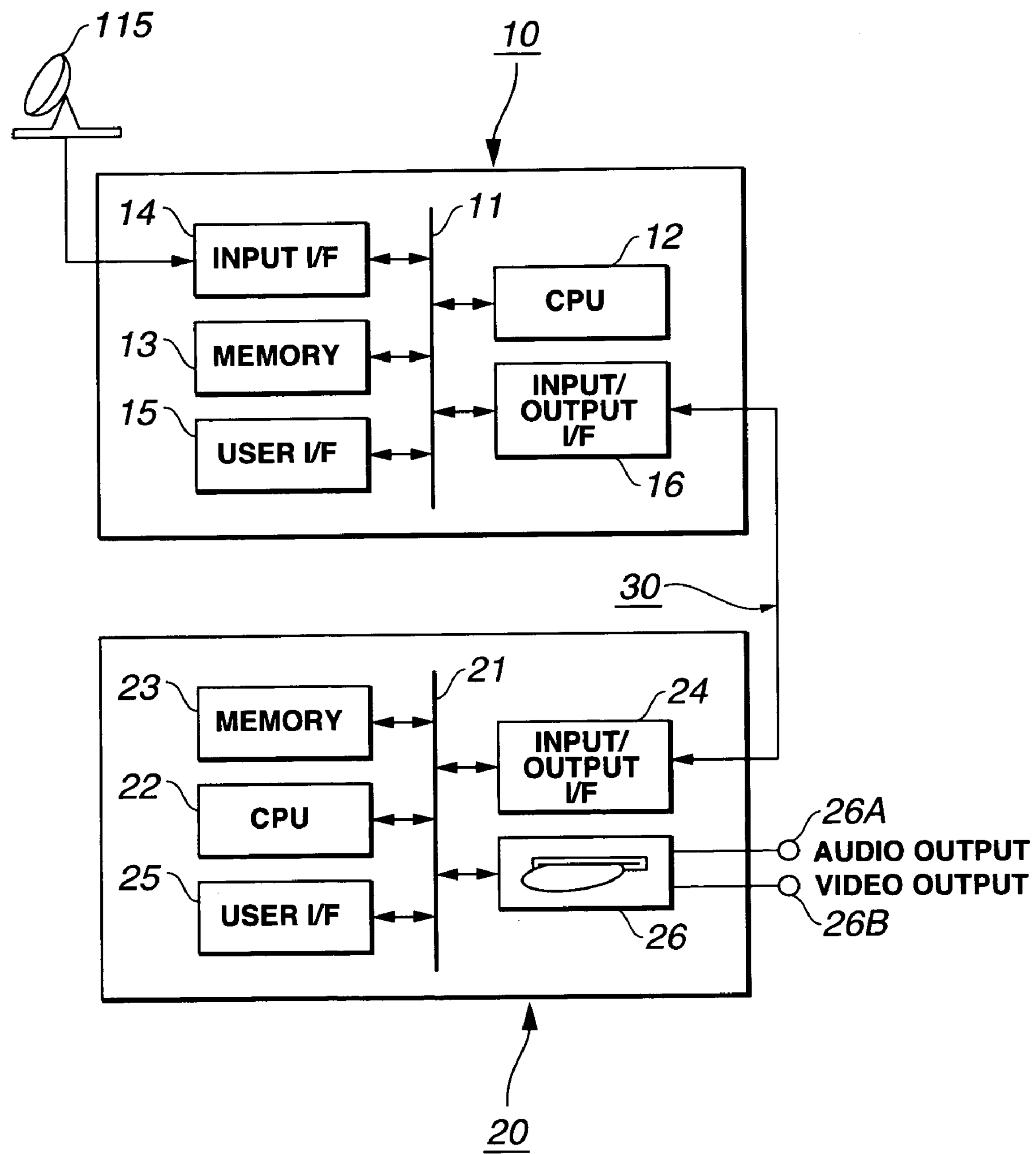
FIG. 5 is a block diagram showing the construction of a data transmission system to which the present invention is applied.

FIG. 5 is a block diagram showing the construction of a data transmission system according to the present invention.

The data transmission system constitutes the AV system 103 included in the above-described digital satellite broadcast system, and has a data transmission apparatus 10 functioning as the IRD 112 and a data receiving apparatus 20 functioning as the MD recorder/player 1. The data transmission apparatus 10 and the data receiving apparatus 20 are connected with each other via a transmission line 30.

In this data transmission system, the data transmission apparatus 10 is a set top box, that is, the IRD 112, for receiving a satellite digital multi-channel broadcast program sent from a communication satellite, and is constituted by a central processing unit (CPU) 12 connected to an internal bus 11, a memory 13, an input interface 14, a user interface 15, and an input/output interface 16. A satellite antenna 115 is connected to the input interface 14. The input/output interface 16 is an IEEE (the Institute of Electrical and Electronics Engineers) 1394 high-performance serial bus interface (hereinafter simply referred to as the IEEE 1394 interface), which is a digital interface, and is connected to the transmission line 30 made of an IEEE 1394 bus.

In this data transmission apparatus 10, the CPU 12 operates in accordance with control programs stored in the memory 13 and performs various types of control operations such as a channel selection operation of a program in response to the operation information inputted via the user interface 15.

Then, the data transmission apparatus 10 selects a desired channel of the satellite digital multi-channel broadcast program signal by the input interface 14 to which the receiving antenna 115 is connected, then receives the contents (music data) and meta-data (related data such as text data and JPEG data) of the desired channel, and transmits the received music data and meta-data (related data) to the transmission line 30 from the input/output interface 16.

The data receiving apparatus 20 is a recording/playback apparatus for recording/playing back the contents (music data) and meta-data (related data) received by the data transmission apparatus 10, that is, the set top box, via a recording medium such as a magnetic tape or a magneto-optical disc. The data receiving apparatus 20 is constituted by a central processing unit 22 connected to an interface bus 21, a memory 23, an input/output interface 24, a user interface 25, and a media access section 26. The input/output interface 24 is an IEEE (the Institute of Electrical and Electronics Engineers) 1394 high-performance serial bus interface (hereinafter simply referred to as the IEEE 1394 interface), which is a digital interface, and is connected with the transmission line 30 made of the IEEE 1394 bus.

Figure 6:
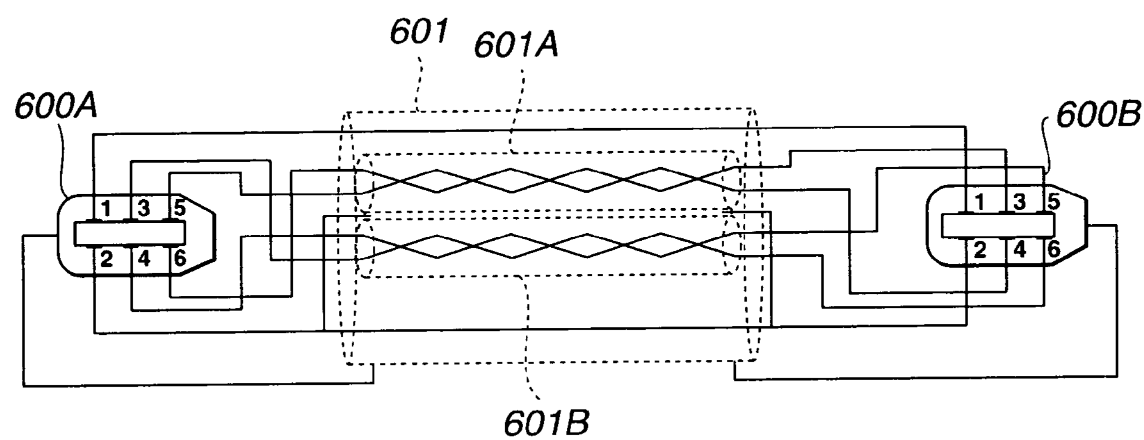
FIG. 6 is an explanatory view schematically showing the structure of an IEEE 1394 bus cable.

FIG. 6 shows an exemplary structure of an IEEE 1394 bus cable which is actually used as the transmission line 30.

In the case shown in FIG. 6, connectors 600A and 600B are connected to each other via a cable 601, and six pins of pin numbers 1 to 6 are used as pin terminals of the connectors 600A and 600B.

For the pint terminals provided in the connectors 600A and 600B, the pin number 1 is assigned to a power source (VP), the pin number 2 is assigned to the ground (VG), the pin number 3 is assigned to TPB1, the pin number 4 is assigned to TPB2, the pin number 5 is assigned to TPA1, and the pin number 6 is assigned to TPA2.

The connection mode of the pins between the connectors 600A and 600B is as follows.

pin number 1 (VP)-pin number 1 (VP)
pin number 2 (VG)-pin number 2 (VG)
pin number 3 (TPB1)-pin number 5 (TPA1)
pin number 4 (TPB2)-pin number 6 (TPA2)
pin number 5 (TPA1)-pin number 3 (TPB1)
pin number 6 (TPA2)-pin number 4 (TPB2)

Among these sets of pin connections, the following set of two twisted wires forms a signal line 601A which mutually transmits a signal in a differential manner.

pin number 3 (TPB1)-pin number 5 (TPA1)
pin number 4 (TPB2)-pin number 6 (TPA2)

Also, the following set of two twisted wires forms a signal line 601B which mutually transmits a signal in a differential manner.

pin number 5 (TPA1)-pin number 3 (TPB1)
pin number 6 (TPA2)-pin number 4 (TPB2)

Figure 7:
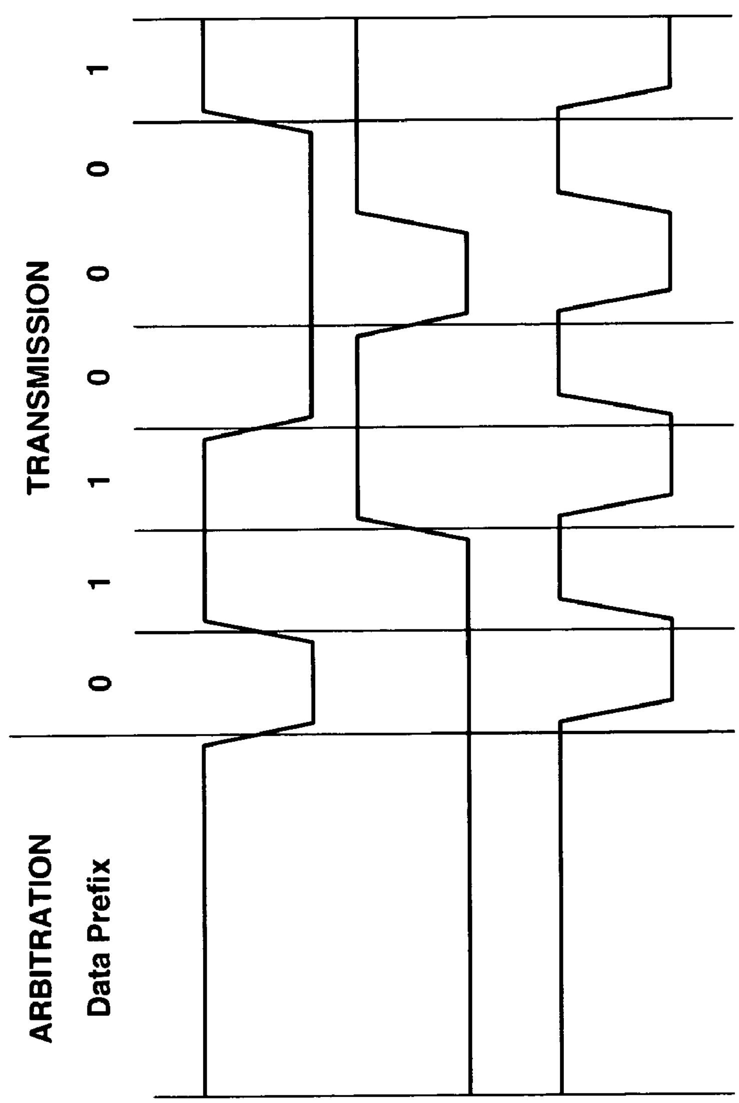
FIGS. 7A to 7C are explanatory views schematically showing a signal transmission mode in IEEE 1394.

The signals transmitted by the two sets of the signal line 601A and the signal line 601B are a data signal (Data) shown in FIG. 7A and a strobe signal (Strobe) shown in FIG. 7B.

The data signal shown in FIG. 7A is outputted from TPB1 or TPB2 by using one of the signal line 601A and the signal line 601B and is inputted to TPA1 or TPA2.

The strobe signal shown in FIG. 7B is a signal obtained by performing predetermined logical operation with respect to the data signal and a transmission clock synchronized with the data signal, and has a frequency lower than that of the actual transmission clock. This strobe signal is outputted from TPA1 or TPA2 by using the other signal line that is not used for data signal transmission, of the signal line 601A and the signal line 601B, and is inputted to TPB1 or TPB2.

For example, if it is assumed that the data signal and the strobe signal shown in FIGS. 7A and 7B are inputted to a particular IEEE 1394-compatible equipment, this equipment performs predetermined logical operation on the inputted data signal and strobe signal, thus generates a transmission clock (Clock) as shown in FIG. 7C, and uses it for required input data signal processing.

In accordance with the IEEE 1394 standard, by adopting such a hardware-related data transmission mode, the need to transmit a transmission clock of a fast cycle between equipments by means of a cable is eliminated and the reliability of signal transmission is improved.

Although the specification of six pins is employed in the above description, there is also the specification of four pins in accordance with the IEEE 1394 format, consisting of only the signal line 601A and the signal line 601B, which are two sets of twisted wires, with the power source (VP) and the ground (VG) omitted. For example, the MD recorder/player 1 in this AV system 103 is actually configured in consideration that a simpler system can be provided for the user by using a cable of the four-pin specification.

In accordance with the IEEE 1394 standard, a transmission operation performed within the network connected via the IEEE 1394 bus is called a subaction, and the following two types of subactions are defined. That is, as the two subactions, an asynchronous transmission mode called "asynchronous data transfer" for carrying out normal data transmission, and a synchronous transmission mode called "isochronous data transfer" in which a transmission band is ensured, are defined.

Figure 8:
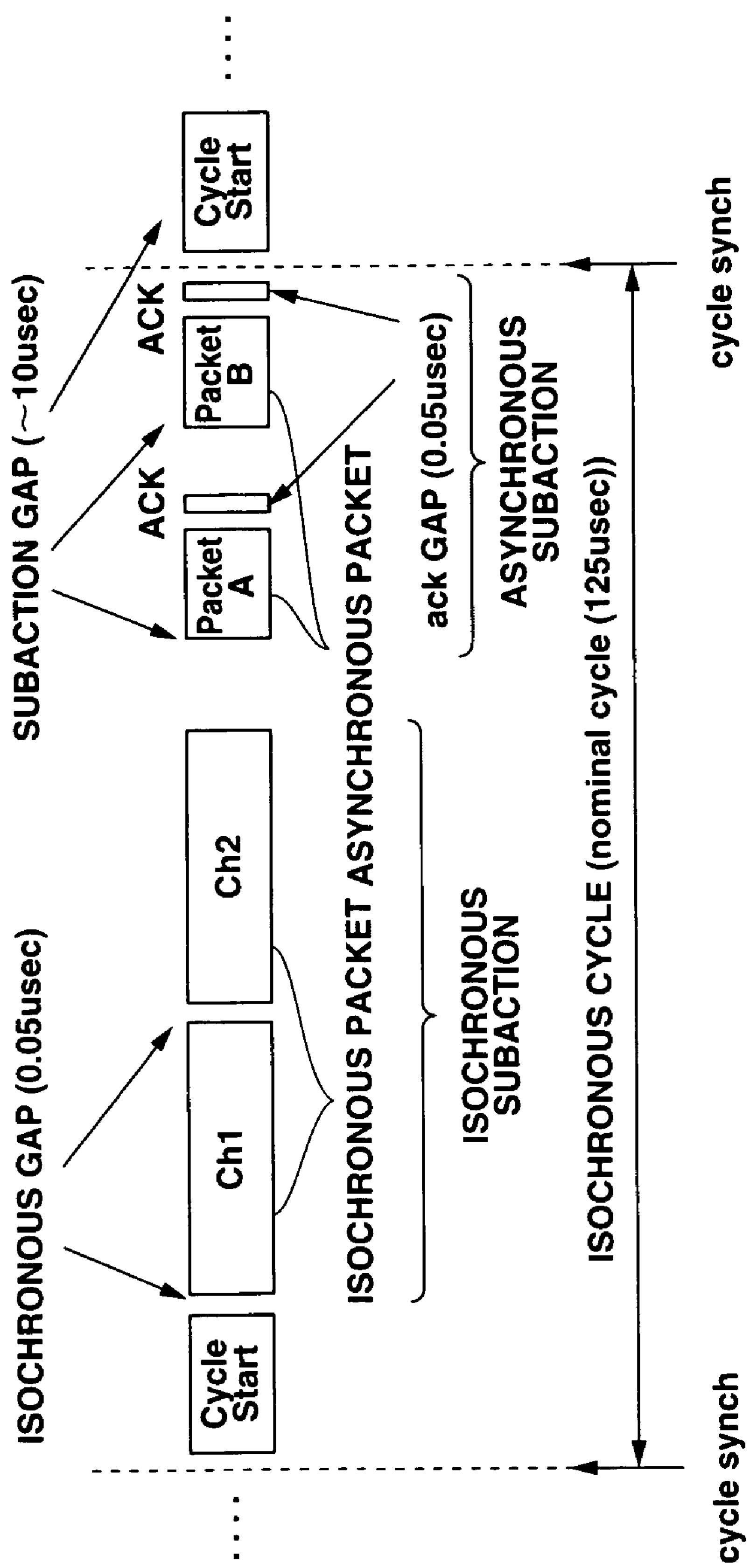
FIG. 8 is an explanatory view showing the overview of packet transmission in IEEE 1394.

Specifically, in accordance with the IEEE 1394 standard, transmission is carried out by repeating the isochronous cycle (nominal cycle) as shown in FIG. 8. In this case, one isochronous cycle is set as 125 μsec, which corresponds to 100 MHZ as a band. It is prescribed that the isochronous cycle may be other than 125 μsec. For each isochronous cycle, the data is divided into packets and then transmitted.

A cycle start packet indicating the start of one isochronous cycle is located at the leading part of this isochronous cycle.

The generation timing of this cycle start packet is indicated by one specific apparatus inside the IEEE 1394 network system defined as a cycle master.

Following the cycle start packet, an isochronous packet is preferentially located. As shown in FIG. 8, the isochronous packet is divided into packets for each channel, and these are arranged and transferred in a time-division manner (isochronous subactions). A pause period (for example, 0.05 μsec) called an isochronous gap is provided for the delimitation for each packet inside the isochronous subactions.

In the manner as described above, in the IEEE 1394 system, it is possible to transmit and receive isochronous data on multiple channels by one transmission line.

For example, in the case of transmission of ATRAC data (compressed audio data) with which the MD recorder/player 1 in this AV system is compatible by an isochronous method, on the assumption that the ATRAC data has a 1×-speed transfer rate of 1.4 Mbps, time-series-like continuity (real-time property) is secured if ATRAC data of at least around 20 and several M bytes is transmitted as isochronous packets for each isochronous cycle.

For example, when a particular equipment transmits ATRAC data, a request for a size of the isochronous packet that is sufficient to secure real-time transmission of the ATRAC data is made to an IRM (isochronous resource manager) inside the IEEE 1394 network system. In the IRM, the current data transmission status is monitored and permission/non-permission is given. If permission is given, it is possible to divide the ATRAC data into isochronous packets and transmit them by the designated channel. This is what is called band reservation in the IEEE 1394 interface.

By using the remaining band which is not used by the isochronous subactions in the band of the isochronous cycle, transmission of asynchronous subactions, that is, asynchronous packets, is performed.

FIG. 8 shows an example in which two asynchronous packets of packet A and packet B are transmitted. Following the asynchronous packet, a signal called ACK (acknowledge) is appended with a pause period of an ack gap (0.05 μsec) provided between them. ACK is a signal outputted from the receiving side (Target) in a hardware-like manner in order to inform the transmission side (Controller) that a certain kind of asynchronous data has been received in the process of asynchronous transaction.

A pause period called a subaction gap of approximately 10 μsec is provided before and after the data transmission unit made up of an asynchronous packet and ACK following this packet.

If ATRAC data is transmitted by isochronous packets, and an AUX data file which is appended to the ATRAC data is transmitted by asynchronous packets, it is seemingly possible to simultaneously transmit the ATRAC data and the AUX data file.

Asynchronous transmission is one-to-one unicast transmission and has a property such that interception thereof is difficult in comparison with isochronous transmission for performing broadcast transmission.

In this data transmission system, music data is transmitted by using isochronous transmission in which a transmission band can be secured, and related information is transmitted by using asynchronous transmission.

The data receiving apparatus 20 receives music data and related information via the input/output interface 24. If the music data and related information are recordable, these are recorded on a recording medium such as a magnetic tape or a magneto-optical disc as described above by the media access section 26.

The music data and the related information recorded on the recording medium are reproduced by the media access section 26. The music data is converted into an analog signal and is outputted from an analog audio output terminal 26A. The related information is outputted from a video output terminal 26B. Also, the music data and the related information reproduced by the media access section 26 may be transmitted to another equipment via the IEEE 1394 interface.

When the data receiving apparatus 20 receives music data the recording of which is prohibited, the data receiving apparatus 20 simply converts the music data into an analog signal without recording the music data on a recording medium by media access section 26, and outputs the signal from the analog audio output terminal 26A.

In this data receiving apparatus 20, the CPU 22 operates in accordance with control programs stored in the memory 23 so that various types of control operations such as a recording operation by the media access section 26 are performed in accordance with operation information which is inputted via the user interface 25.

In this data transmission system, the contents (music data) and meta-data (related data, that is, text data, JPEG data and the like) of a desired channel received by the data transmission apparatus 10 via the receiving antenna 115 are encrypted by different encryption methods and encryption keys, and are transmitted to the data receiving apparatus 20.

Figure 9:
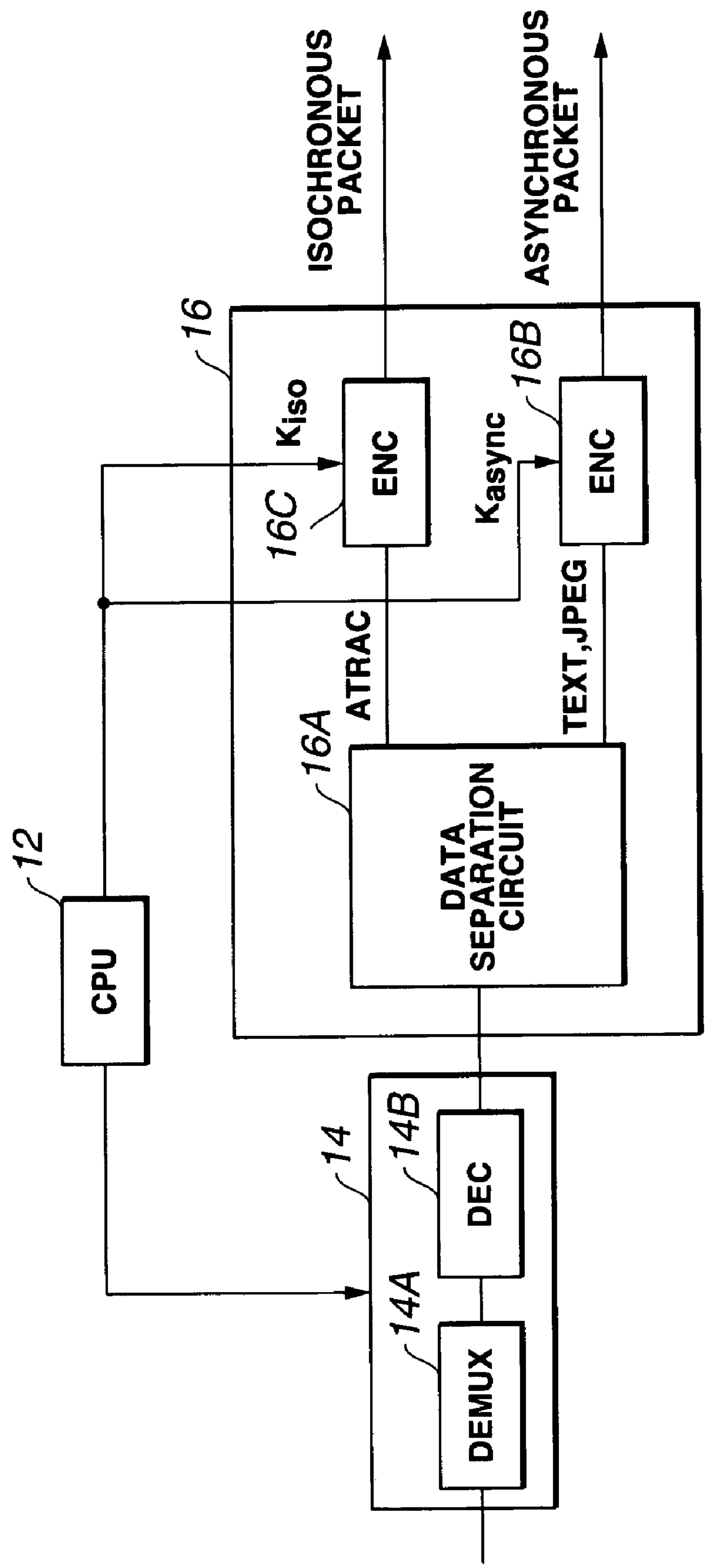
FIG. 9 is a block diagram showing the construction of an essential portion of a data transmission apparatus in the data transmission system.

Specifically, as shown in FIG. 9, which shows the construction of an essential portion of the data transmission 10, the input interface 14 of the data transmission apparatus 10 has a demultiplexer (DEMUX) 14A for selecting a desired channel of a satellite digital multi-channel broadcast signal, and a decoder (DEC) 14B for decoding a transport stream of a desired channel selected by the demultiplexer (DEMUX) 14A. The input/output interface 16 has a data separation circuit 16A for separating the contents (music data) and meta-data (related data such as text data and JPEG data) contained in the transport stream of a desired channel decoded by the decoder (DEC) 14B, a first encoder 16B for encrypting the contents (music data) separated by the data separation circuit 16A using an encryption key Kiso by a first encryption method and thus creating isochronous packets, and a second encoder 16C for encrypting the meta-data (related data) separated by the data separation circuit 16A using an encryption key Kasync by a second encryption method and thus creating asynchronous packets.

Figure 10:
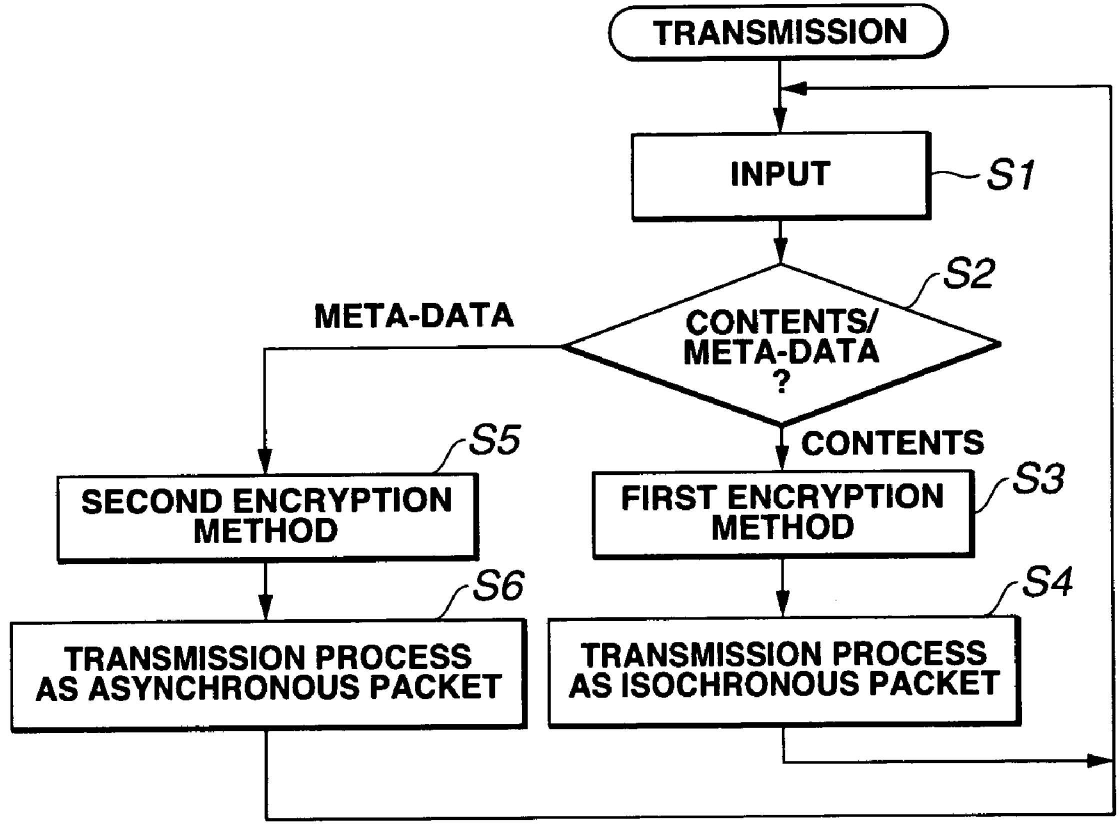
FIG. 10 is a flowchart showing the operation of the data transmission apparatus.

The input/output interface 16 in the data transmission apparatus 10 is controlled by the CPU 12 and operates as shown in the flowchart of FIG. 10. That is, when a transport stream of a desired channel received via the input interface 14 is inputted (step S1), the input/output interface 16 determines whether the data contained in the inputted transport stream is the contents (music data) or meta-data (related data) (step S2). When the data is the contents (music data), the contents (music data) are encrypted using an encryption key Kiso by a first encryption method (step S3), and a process for transmitting the contents (music data) encrypted by the first encryption method as isochronous packets is performed (step S4). When the data contained in the inputted transport stream is the meta-data (related data), the meta-data (related data) is encrypted using an encryption key Kasync by a second encryption method (step S5), and a process for transmitting the meta-data (related data) encrypted by the second encryption method as asynchronous packets is performed (step S6).

Figure 11:
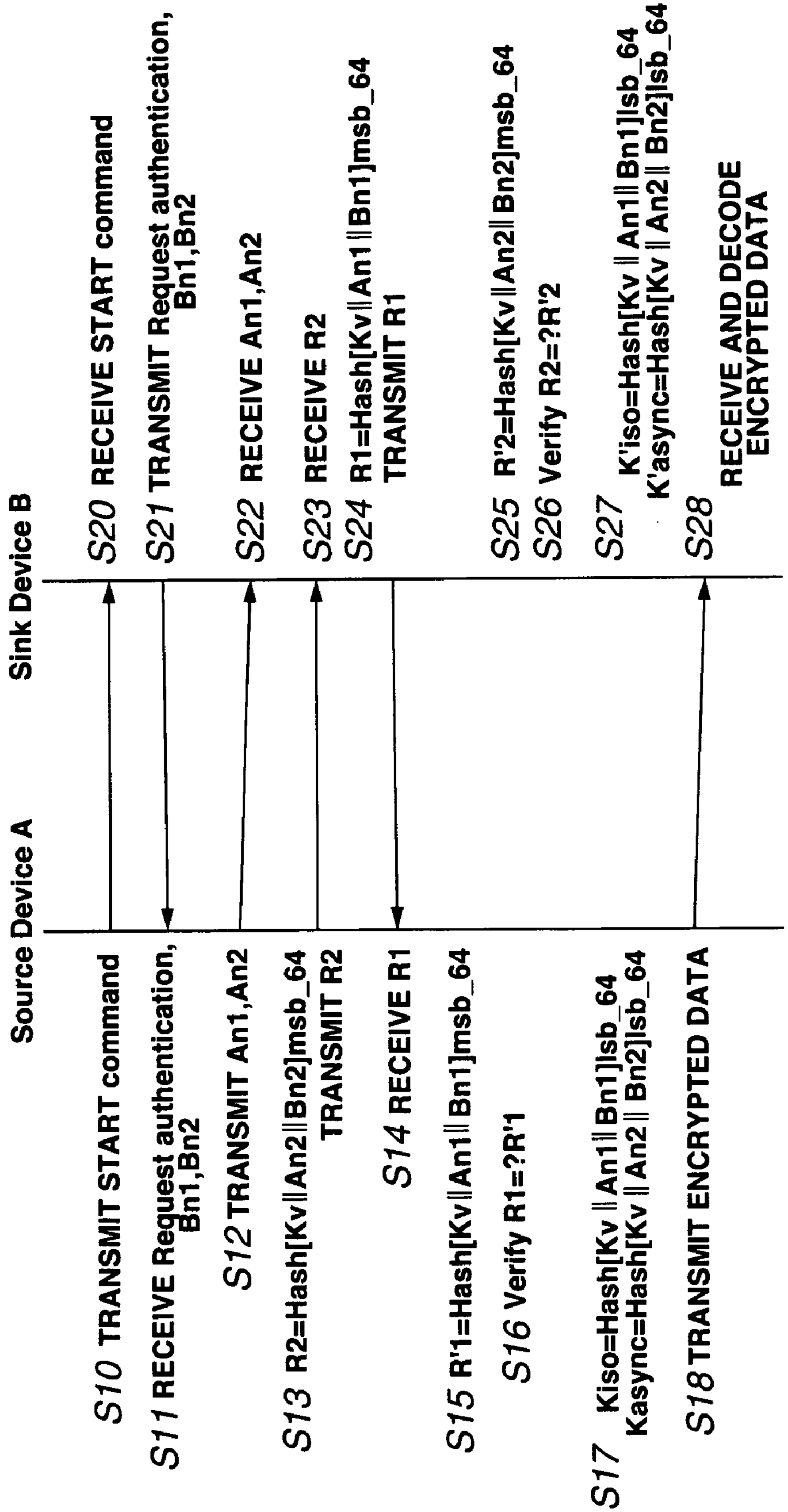
FIG. 11 is a flowchart showing the procedure of data transmission in the data transmission system.
Figure 12:
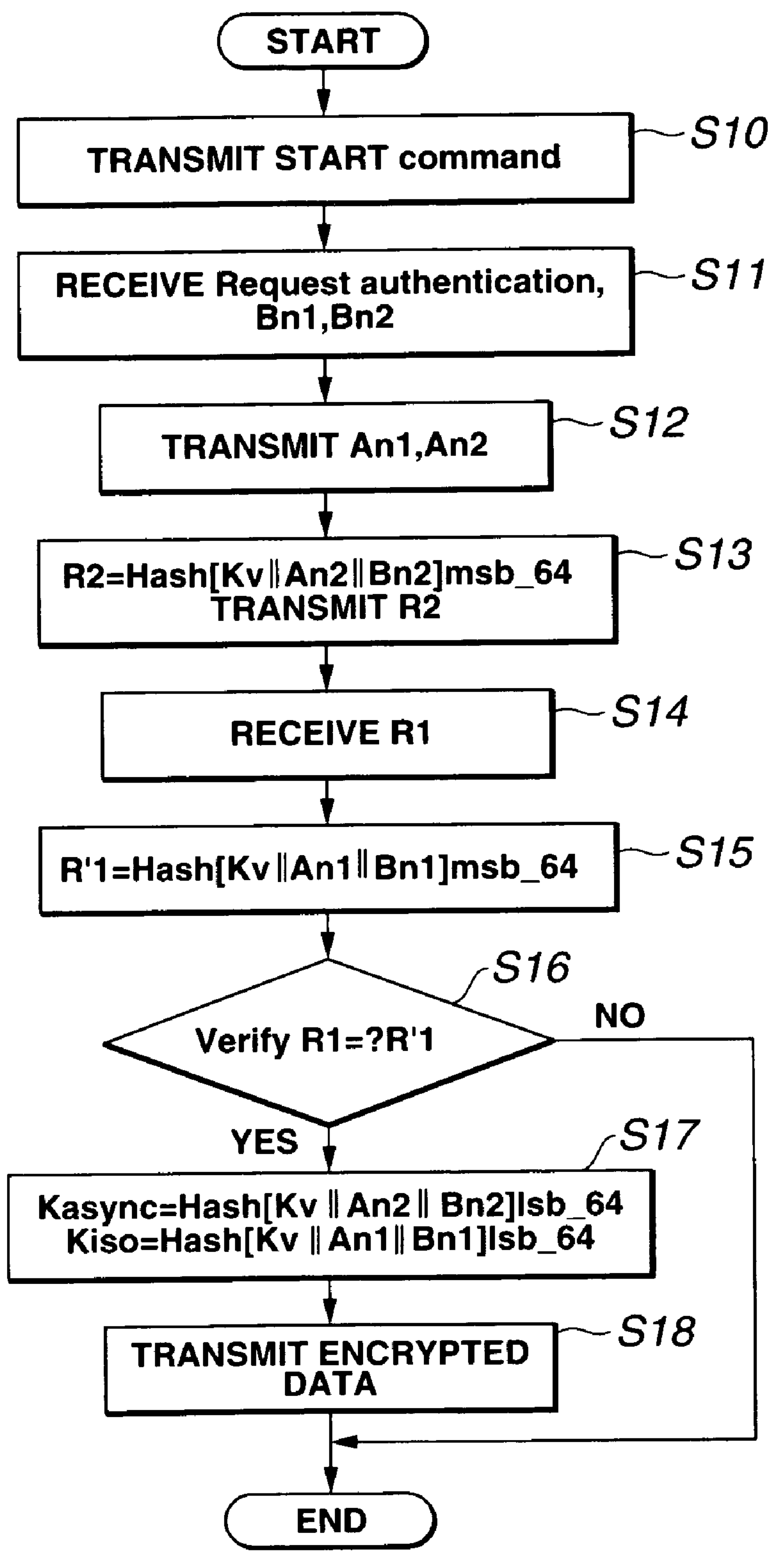
FIG. 12 is a flowchart showing the processing procedure on the data transmission apparatus side in the data transmission system.
Figure 13:
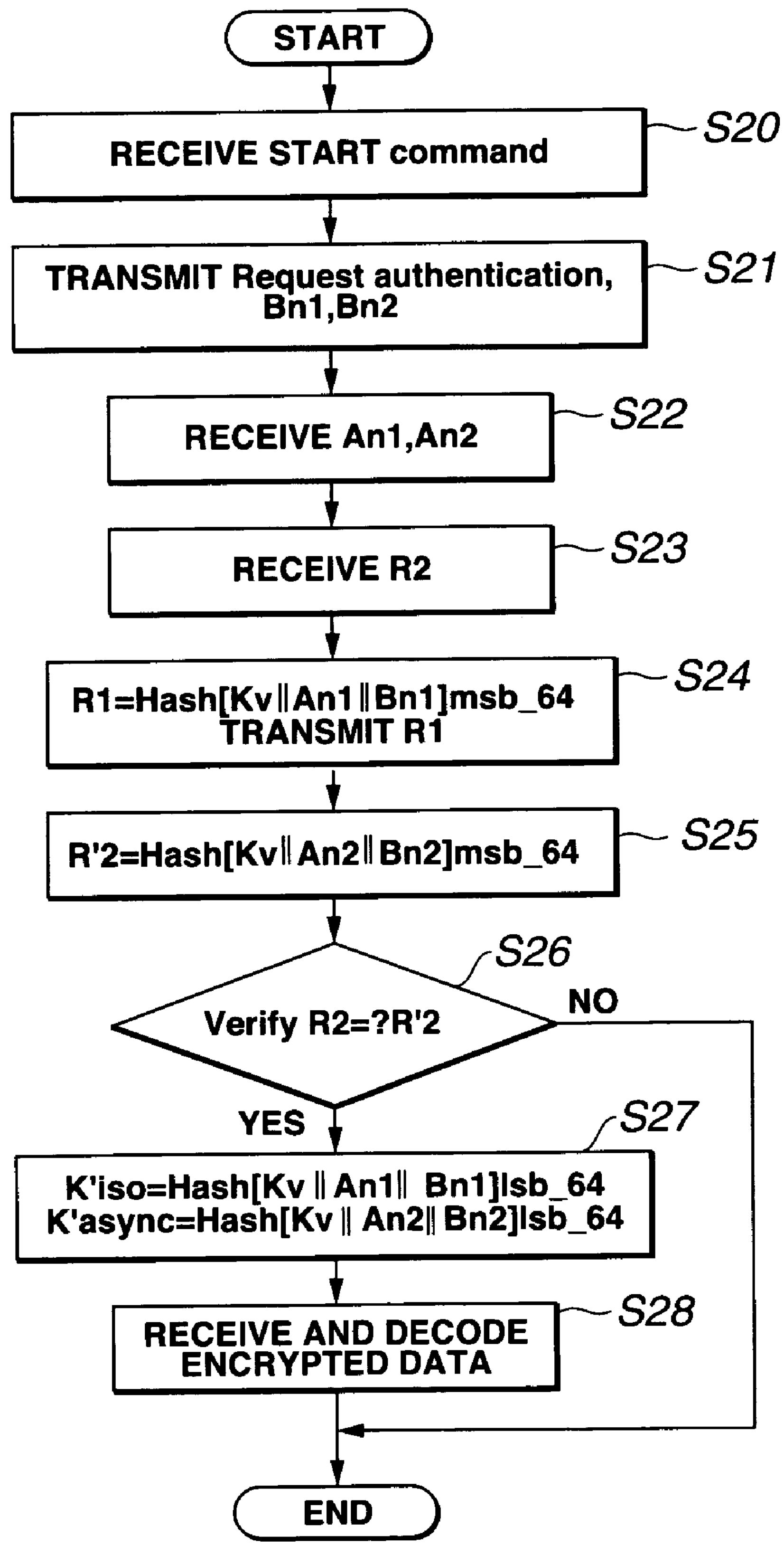
FIG. 13 is a flowchart showing the processing procedure on the data receiving apparatus side in the data transmission system.

In this data transmission system, prior to the data transmission, a protocol for performing mutual authentication and for sharing two types of encryption keys for isochronous and asynchronous transmission is performed between the data transmission apparatus 10 and the data receiving apparatus 20. Specifically, after the authentication and key sharing protocol as shown in the flowchart of FIG. 11 is performed, data is transmission is carried out. The processing procedure on the data transmission apparatus 10 side in this data transmission system is shown in the flowchart of FIG. 12, and the processing procedure on the data receiving apparatus 20 side is shown in the flowchart of FIG. 13.

In FIG. 11 showing the authentication and key sharing protocol, the data transmission apparatus 10 is shown as a source device A, and the data receiving apparatus 20 is shown as a sink device B. These apparatuses are given information Kv indicating the validity of themselves at the time of manufacture, and hold this information in secret.

In this data transmission system, the CPU 12 of the data transmission apparatus 10, that is, the set top box, first transmits a start command for starting the transmission of data from the input/output interface 16 to the data receiving apparatus 20 via the transmission line 30 (step S10).

After the CPU 22 of the data receiving apparatus 20, that is, the recording apparatus, receives the start command (START command) sent from the data transmission apparatus 10 via the transmission line 30 connected to the input/output interface 24 (step S20), the CPU 22 generates a request for starting the authentication and key sharing protocol (Request authentication) and two random numbers Bn1 and Bn2 of m (e.g., m=64) bits and transmits them to the data transmission apparatus 10 via the input/output interface 24 (step S21).

After the CPU 12 of the data transmission apparatus 10 receives the request for starting the authentication and key sharing protocol (Request authentication) and the two random numbers Bn1 and Bn2 sent from the data receiving apparatus 20 via the transmission line 30 connected to the input/output interface 16 (step S11), the CPU 12 generates two random numbers An1 and An2 of m bits and sends them to the data transmission apparatus 10 via the input/output interface 16 (step S12).

The data receiving apparatus 20 receives the two random number An1 and An2 sent from the data transmission apparatus 10 (step S22).

Then, the CPU 12 of the data transmission apparatus 10 generates concatenated data (Kv||An2||Bn2) formed by concatenating the information Kv indicating the validity of the apparatus itself, the random number An2 sent to the data receiving apparatus 20 at step S12 and the random number Bn2 received at step S11, and inputs this concatenated data (Kv||An2||Bn2) to a hash function Hash[ ].

$$R2=\text{Hash}[Kv\|An2\|Bn2]msb\_m$$

The CPU 12 then sets the most significant m bits of the output thereof as response data R2 and sends this response data R2 to the data receiving apparatus 20 via the input/output interface 16 (step S13). FIGS. 11 and 12 show an example in m=64 bits is used. In this case, X||Y indicates bit coupling of X and Y. Although the most significant m bits which provide the response data R2 are of the same number of bits as the number of bits m of the random number, the number of bits may be different.

The CPU 22 of the data receiving apparatus 20 receives the response data R2 sent from the data transmission apparatus 10 (step S23). The CPU 22 then generates concatenated data (Kv||An1||Bn1) formed by concatenating the information Kv indicating the validity of the apparatus itself, the random number An1 received at step S22 and the random number Bn1 sent to the data transmission apparatus 10 at step S21, and inputs this concatenated data (Kv||An1||Bn1) to a hash function Hash[ ].

$$R1=\text{Hash}[Kv\|An1\|Bn1]msb\_m$$

The CPU 22 then sets the most significant m bits of the output thereof as response data R1 and sends this response data R1 to the data transmission apparatus 10 via the input/output interface 24 (step S24). FIGS. 11 and 13 show an example in m=64 bits is used. Although the most significant m bits which provide the response data R1 are of the same number of bits as the number of bits m of the random number, the number of bits may be different.

The CPU 12 of the data transmission apparatus 10 receives the response data R1 sent from the data receiving apparatus 20 (step S14).

Moreover, the CPU 12 of the data transmission apparatus 10 generates concatenated data (Kv||An1||Bn1) formed by concatenating the information Kv indicating the validity of the apparatus itself, the random number An1 sent to the data receiving apparatus 20 at step S12 and the random number Bn1 received at step S11, and inputs this concatenated data (Kv||An1||Bn1) to a hash function Hash[ ].

$$R'1=\text{Hash}[Kv\|An1\|Bn1]msb\_m$$

The CPU 12 then sets the most significant m bits of the output thereof as reference data R'1 (step S15). That is, the same m bits as the response data R1 are caused to be the reference data R'1.

Then, the CPU 12 of the data transmission apparatus 10 compares the reference data R'1 with the response data R1 received at step S14 (step S16). If the response data R1 does not match the reference data R'1 at this step S16, the CPU 12 of the data transmission apparatus 10 determines that the data receiving apparatus 20 is an unauthorized apparatus, and terminates the authentication and key sharing protocol.

When the response data R1 matches the reference data R'1 at step S16, the CPU 12 of the data transmission apparatus 10 determines that the data receiving apparatus 20 is an authorized apparatus, and inputs the concatenated data (Kv||An1||Bn1) formed by concatenating the information Kv indicating the validity of the apparatus itself, the random number An1 sent to the data receiving apparatus 20 at step S12 and the random number Bn1 received at step 11 to a hash function Hash[ ].

$$Kiso=\text{Hash}[Kv\|An1\|Bn1]lsb\_m$$

The CPU 12 then sets the least significant m bits of the output thereof as an encryption key Kiso to be used to encrypt the data to be transmitted by isochronous transmission. The CPU 12 of the data transmission apparatus 10 also inputs the concatenated data (Kv||An2||Bn2) formed by concatenating the information Kv indicating the validity of the apparatus itself, the random number An2 sent to the data receiving apparatus 20 at step S12 and the random number Bn2 received at step 11 to a hash function Hash[ ].

$$Kasync=\text{Hash}[Kv\|An2\|Bn2]lsb\_m$$

The CPU 12 then sets the least significant m bits of the output thereof as an encryption key Kasync to be used to encrypt the data to be transmitted by asynchronous transmission (step S17).

Although the least significant m bits which provide the two types of encryption keys Kiso and Kasync are of the same number of bits as the number of bits m of the random number, the number of bits may be different.

Meanwhile, the CPU 22 of the data receiving apparatus 20 generates concatenated data (Kv||An2||Bn2) formed by concatenating the information Kv indicating the validity of the apparatus itself, the random number An2 received at step S22 and the random number Bn2 sent to the data transmission apparatus 10 at step S21, and inputs this concatenated data (Kv||An2||Bn2) to a hash function Hash[ ].

$$R'2=\text{Hash}[Kv\|An2\|Bn2]msb\_m$$

The CPU 22 then sets the most significant m bits of the output thereof as reference data R'2 (step S25). That is, the same m bits as the response data R2 are caused to be the reference data R'2.

Then, the CPU 22 of the data receiving apparatus 20 compares the reference data R'2 with the response data R2 received at step S23 (step S26). If the response data R2 does not match the reference data R'2 at this step S26, the CPU 22 of the data receiving apparatus 20 determines that the data transmission apparatus 10 is an unauthorized apparatus, and terminates the authentication and key sharing protocol.

When the response data R2 matches the reference data R'2 at step S26, the CPU 22 of the data receiving apparatus 20 determines that the data transmission apparatus 10 is an authorized apparatus, and inputs the concatenated data (Kv||An1||Bn1) formed by concatenating the information Kv indicating the validity of the apparatus itself, the random number An1 received at step S22 and the random number Bn1 sent to the data transmission apparatus 10 at step aS21 to a hash function Hash[ ].

$$K'iso=\text{Hash}[Kv\|An1\|Bn1]lsb\_m$$

The CPU 22 then sets the least significant m bits of the output thereof as an encryption key K'iso to be used to decode the data transmitted by isochronous transmission. That is, the same m bits as the encryption key Kiso are caused to be the encryption key K'iso.

The CPU 22 also inputs the concatenated data (Kv||An2||Bn2) formed by concatenating the information Kv indicating the validity of the apparatus itself, the random number An2 received at step S22 and the random number Bn2 sent to the data transmission apparatus 10 at step S21 to a hash function Hash[ ].

$$K'async=\text{Hash}[Kv\|An2\|Bn2]lsb\_m$$

The CPU 22 then sets the least significant m bits of the output thereof as an encryption key K'async to be used to decode the data transmitted by asynchronous transmission (step S27). That is, the same m bits as the encryption key Kasync are caused to be the encryption key K'async.

In this data transmission system, prior to data transmission, the authentication and key sharing protocol is performed by asynchronous transmission of IEEE 1394 between the data transmission apparatus 10 and the data receiving apparatus 20. Thus, the data transmission apparatus 10 and the data receiving apparatus 20 can authenticate the validity of each other and can share the encryption key for transmitting encrypted data by isochronous transmission and the encryption key for transmitting encrypted data by asynchronous transmission.

Also, in this data transmission system, after the authentication and key sharing protocol is executed, the music data from the data transmission apparatus 10 is encrypted using the encryption key Kiso and transmitted by isochronous transmission, and the related data is encrypted using the encryption key Kasync and transmitted by asynchronous transmission (step S18). The data receiving apparatus 20 decodes the music data transmitted by isochronous transmission, using the encryption key K'iso, and decodes the related data transmitted by asynchronous transmission, using the encryption key K'async (step S28).

That is, after the execution of the authentication and key sharing protocol, the data receiving apparatus 20 decodes the music data sent by isochronous transmission from the data transmission apparatus 10, by using the encryption key K'iso, and decodes the related data sent by asynchronous transmission, by using the encryption key K'async, so that the respective plain text data can be obtained.

[Another Example of Authentication and Key Sharing Protocol]

Figure 14:
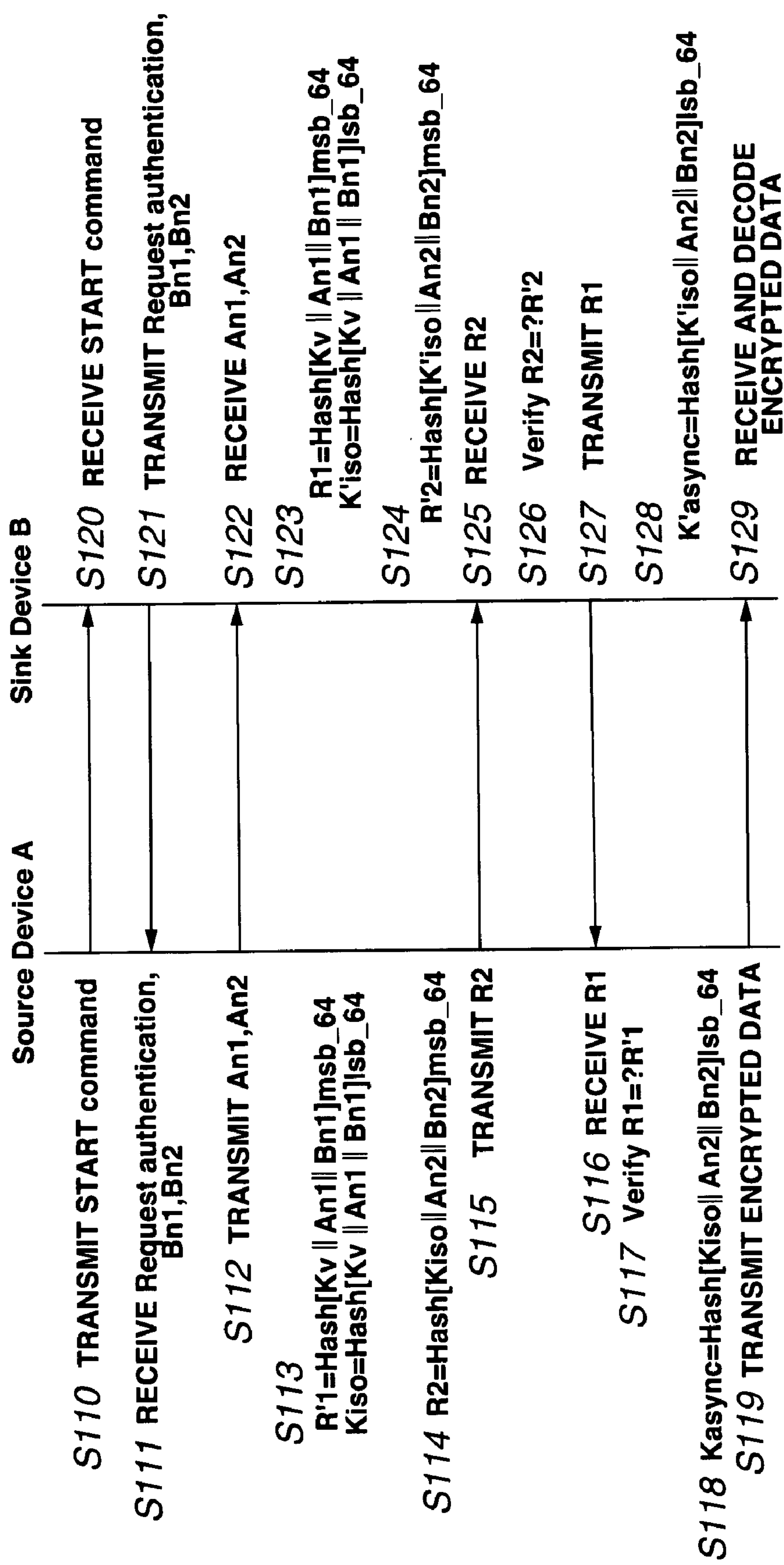
FIG. 14 is a flowchart showing another procedure of data transmission in the data transmission system.
Figure 15:
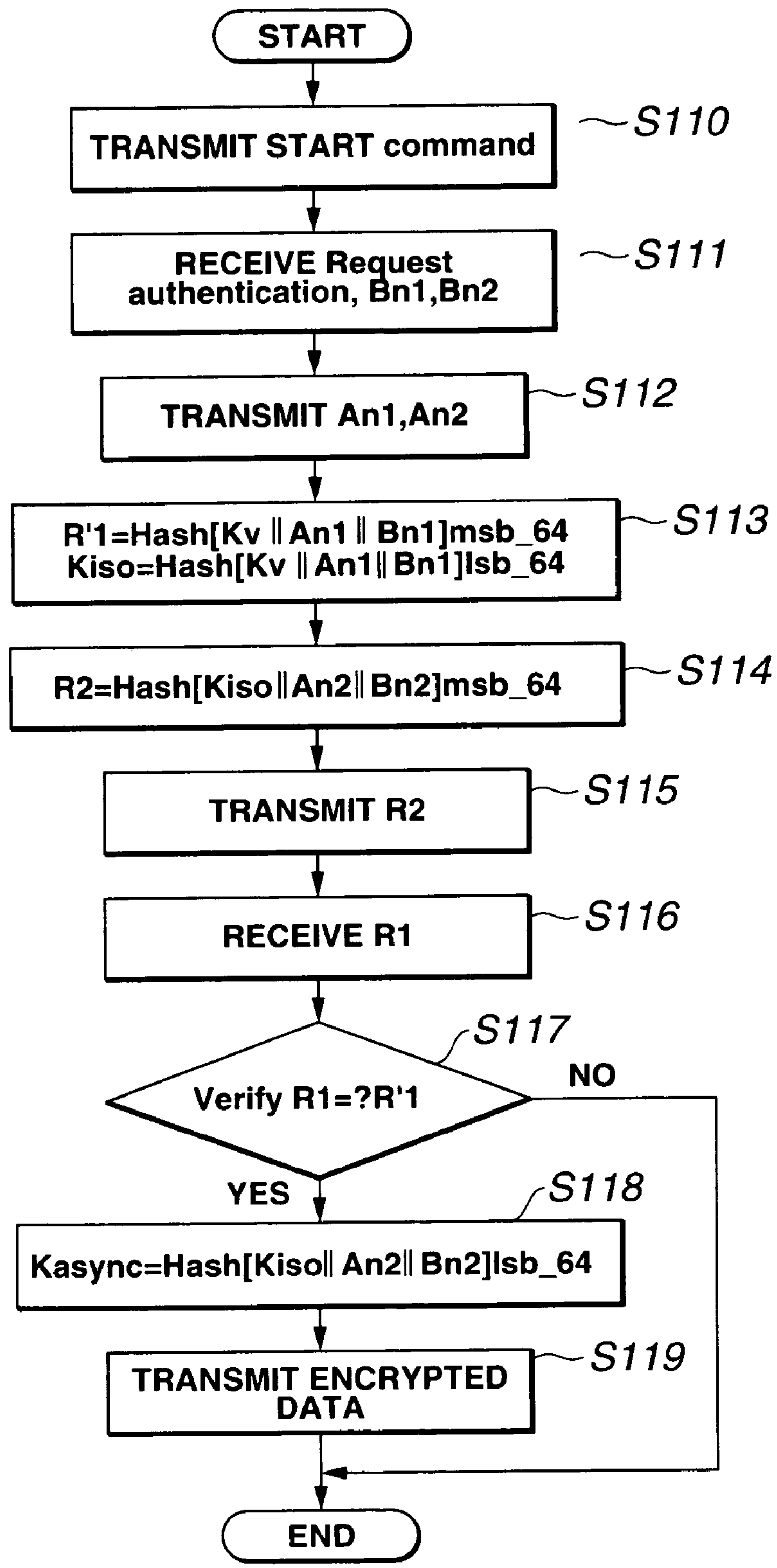
FIG. 15 is a flowchart showing another processing procedure on the data transmission apparatus side in the data transmission system.
Figure 16:
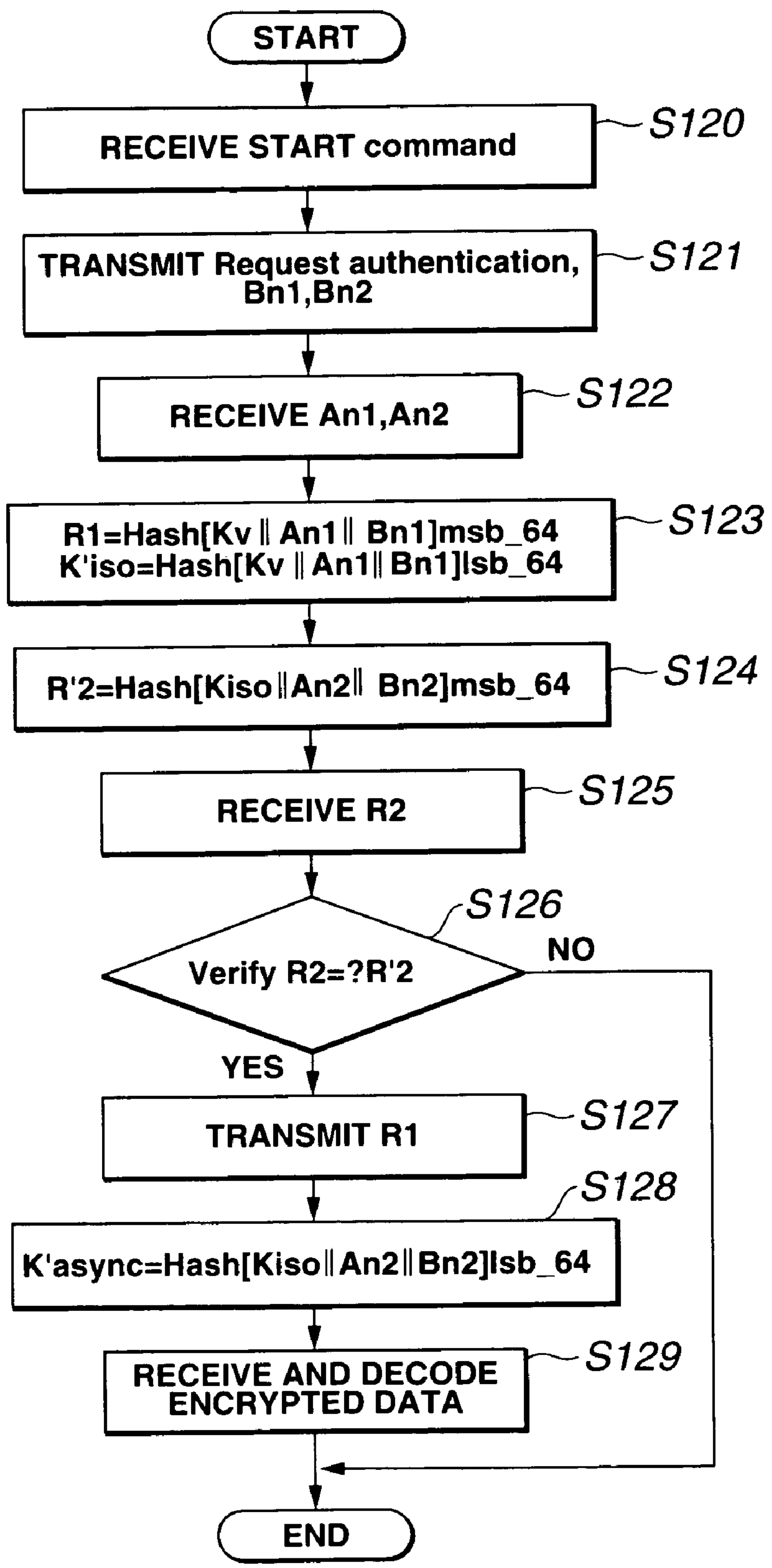
FIG. 16 is a flowchart showing another processing procedure on the data receiving apparatus side in the data transmission system.

Another example of the authentication and key sharing protocol to be executed prior to the data transmission in this data transmission system is shown in the flowchart of FIG. 14. The processing procedure on the data transmission apparatus 10 side in this case is shown in the flowchart of FIG. 15, and the processing procedure on the data receiving apparatus 20 side is shown in the flowchart of FIG. 16.

In FIG. 14 showing the authentication and key sharing protocol, the data transmission apparatus 10 is shown as a source device A, and the data receiving apparatus 20 is shown as a sink device B. These apparatuses are given information Kv indicating the validity of themselves at the time of manufacture, and hold this information in secret.

In this data transmission system, the CPU 12 of the data transmission apparatus 10, that is, the set top box, first transmits a start command for starting the transmission of data from the input/output interface 16 to the data receiving apparatus 20 via the transmission line 30 (step S110).

After the CPU 22 of the data receiving apparatus 20, that is, the recording apparatus, receives the start command (START command) sent from the data transmission apparatus 10 via the transmission line 30 connected to the input/output interface 24 (step S120), the CPU 22 generates a request for starting the authentication and key sharing protocol (Request authentication) and two random numbers Bn1 and Bn2 of m (e.g., m=64) bits and transmits them to the data transmission apparatus 10 via the input/output interface 24 (step S121).

After the CPU 12 of the data transmission apparatus 10 receives the request for starting the authentication and key sharing protocol (Request authentication) and the two random numbers Bn1 and Bn2 sent from the data receiving apparatus 20 via the transmission line 30 connected to the input/output interface 16 (step S111), the CPU 12 generates two random numbers An1 and An2 of m bits and sends them to the data transmission apparatus 10 via the input/output interface 16 (step S112).

The data receiving apparatus 20 receives the two random number An1 and An2 sent from the data transmission apparatus 10 (step S122).

Then, the CPU 12 of the data transmission apparatus 10 generates concatenated data (Kv||An1||Bn1) formed by concatenating the information Kv indicating the validity of the apparatus itself, the random number An1 sent to the data receiving apparatus 20 at step S112 and the random number Bn1 received at step S111, and inputs this concatenated data (Kv||An1||Bn1) to a hash function Hash[ ].

$$R'1=\text{Hash}[Kv\|An1\|Bn1]msb\_p$$

$$Kiso=\text{Hash}[Kv\|An1\|Bn1]lsb\_n$$

The CPU 12 then sets the most significant p bits of the output thereof as reference data R'1 and sets the least significant n (e.g., n=64) bits as an encryption key Kiso used for encrypting the data to be transmitted by isochronous transmission (step S113). In this case, X||Y indicates bit coupling of X and Y.

Then, the CPU 12 of the data transmission apparatus 10 generates concatenated data (Kiso||An2||Bn2) formed by concatenating the encryption key Kiso thus calculated, the random number An2 sent to the data receiving apparatus 20 at step S112 and the random number Bn2 received at step S111, and inputs this concatenated data (Kiso||An2||Bn2) to a hash function Hash[ ].

$$R2=\text{Hash}[Kiso\|An2\|Bn2]msb\_p$$

The CPU 12 sets the most significant p bits of the output thereof as response data R2 (step S114).

Then, the CPU 12 of the data transmission apparatus 10 sends the response data R2 calculated at step S114 to the data receiving apparatus 20 via the input/output interface 16 (step S115).

On the other hand, the CPU 22 of the data receiving apparatus 20 generates concatenated data (Kv||An1||Bn1) formed by concatenating the information Kv indicating the validity of the apparatus itself, the random number An1 received at step S122 and the random number Bn1 sent to the data transmission apparatus 10 at step S121, and inputs this concatenated data (Kv||An1||Bn1) to a hash function Hash[ ].

$$R1=\text{Hash}[Kv\|An1\|Bn1]msb\_p$$

$$K'iso=\text{Hash}[Kv\|An1\|Bn1]lsb\_n$$

The CPU 22 then sets the most significant p bits of the output thereof as response data R1 and sets the least significant n bits as an encryption key K'iso used for decoding the data transmitted by isochronous transmission (step S123).

Then, the CPU 22 of the data receiving apparatus 20 generates concatenated data (K'iso||An2||Bn2) formed by concatenating the encryption key K'iso thus calculated, the random number An2 received at step S122 and the random number Bn2 transmitted to the data receiving apparatus 10 step S121, and inputs this concatenated data (K'iso||An2||Bn2) to a hash function Hash[ ].

$$R'2=\text{Hash}[K'iso\|An2\|Bn2]msb\_p$$

The CPU 22 sets the most significant p bits of the output thereof as reference data R'2 (step S124).

Then, the CPU 22 of the data receiving apparatus 20 receives the response data R2 sent from the data transmission apparatus 10 (step S125) and compares the response data R2 with the reference data R'2 calculated at step S124 (step S126). If the response data R2 does not match the reference data R'2 at this step S126, the CPU 22 of the data receiving apparatus 20 determines that the data transmission apparatus 10 is an unauthorized apparatus, and terminates the authentication and key sharing protocol.

When the response data R2 matches the reference data R'2 at step S126, the CPU 22 of the data receiving apparatus 20 sends the response data R1 calculated at step S123 to the data transmission apparatus 10 via the input/output interface 16 (step S127).

The CPU 12 of the data transmission apparatus 10 receives the response data R1 sent from the data receiving apparatus 20 (step S116) and compares the response data R1 with the reference data R'1 calculated at step S113 (step S117). If the response data R1 does not match the reference data R'1 at step S117, the CPU 12 of the data transmission apparatus 20 determines that the data receiving apparatus 20 is an unauthorized apparatus, and terminates the authentication and key sharing protocol.

When the response data R1 matches the reference data R'1 at step S17, the CPU 12 of the data transmission apparatus 10 determines that the data receiving apparatus 20 is an authorized apparatus. The CPU 12 then generates concatenated data (Kiso||An2||Bn2) formed by the encryption key Kiso calculated at step S113, the random number An2 sent to the data receiving apparatus 20 at step S112 and the random number Bn2 received at step S111, and inputs the concatenated data (Kiso||An2||Bn2) to a hash function Hash[ ].

$$Kasync=\text{Hash}[Kiso\|An2\|Bn2]lsb\_q$$

The CPU 12 then sets the least significant q (e.g., q=64) bits of the output thereof as an encryption key Kasync to be used to encrypt the data to be transmitted by asynchronous transmission (step S118).

The CPU 22 of the data receiving apparatus 20 generates concatenated data (K'iso||An2||Bn2) formed by the encryption key K'iso calculated at step S123, the random number An2 received at step S122 and the random number Bn2 sent to the data transmission apparatus 10 at step S121, and inputs the concatenated data (K'iso||An2||Bn2) to a hash function Hash[ ].

$$K'async=\text{Hash}[K'iso\|An2\|Bn2]lsb\_q$$

The CPU 22 then sets the least significant q bits of the output thereof as an encryption key K'async to be used to decode the data transmitted by asynchronous transmission (step S128).

In this data transmission system, prior to data transmission, the authentication and key sharing protocol is performed by asynchronous transmission of IEEE 1394 between the data transmission apparatus 10 and the data receiving apparatus 20. Thus, the data transmission apparatus 10 and the data receiving apparatus 20 can authenticate the validity of each other and can share the encryption key for transmitting encrypted data by isochronous transmission and the encryption key for transmitting encrypted data by asynchronous transmission.

That is, after the authentication and key sharing protocol is executed, the music data from the data transmission apparatus 10 is encrypted using the encryption key Kiso and transmitted by isochronous transmission, and the related data is encrypted using the encryption key Kasync and transmitted by asynchronous transmission (step S119). The data receiving apparatus 20 decodes the music data transmitted by isochronous transmission, using the encryption key K'iso, and decodes the related data transmitted by asynchronous transmission, using the encryption key K'async (step 129). Thus, the respective plain text data can be obtained.

In general, since isochronous transmission and asynchronous transmission have different characteristics, encryption algorithms and modes suitable therefor are used. Accordingly, when the encryption algorithm used for asynchronous transmission is weaker in terms of strength than that used for isochronous transmission, the encryption key Kasync used for asynchronous transmission is revealed relatively easily in comparison with the encryption key Kiso used for isochronous transmission. In the authentication and key sharing protocol shown in FIG. 11, the encryption key Kasync and the encryption key Kiso are directly generated from the information Kv indicating the validity of the apparatus itself, which is held by each apparatus in secret. Therefore, if the encryption key Kasync is revealed, the information Kv is revealed by, for example, a round-robin attack.

In contrast, in the authentication and key sharing protocol shown in FIG. 14, the encryption key Kiso is generated from the information Kv indicating the validity of the apparatus itself, which is held by each apparatus in secret, and the encryption key Kasync is generated from the encryption key Kiso. Therefore, even if the encryption key Kasync is revealed, the attacker cannot obtain the information Kv by attacking the unidirectional function Hash only once. The attacker must find the encryption key Kiso by a round-robin attack and then carry out a round-robin attack on the information Kv.

That is, in the authentication and key sharing protocol shown in FIG. 14, in comparison with the authentication and key sharing protocol shown in FIG. 11, the information Kv indicating the validity of the apparatus itself held by each apparatus in secret is hard to reveal, and the data requiring the assurance of a transmission band and related data relating to this data can be transmitted safely and reliably.

In accordance with the authentication and key sharing protocol shown in FIG. 14, in the above-described data transmission system, the encryption key Kasync used for asynchronous transmission is generated on the basis of the encryption key Kiso used for isochronous transmission. However, the encryption key Kasync used for asynchronous transmission may be generated from the information Kv, the random number An1 and the random number Bn1, and the encryption key Kiso used for isochronous transmission may be generated from the encryption key Kasync, the random number An2 and the random number Bn2.

Also, in accordance with the authentication and key sharing protocol shown in FIG. 14, the data generated from the encryption key Kiso at the data transmission apparatus 10 is transmitted as the response data R2 to the data receiving apparatus 20, and the data generated from the information Kv at the data receiving apparatus 20 is transmitted as the response data R1 to the data transmission apparatus 10. However, the data generated from the information Kv by the data transmission apparatus 10 may be transmitted as the response data R2 to the data receiving apparatus 20, and the data generated from the encryption key Kiso by the data receiving apparatus 20 may be transmitted as the response data R1 to the data transmission apparatus 10.

In the above-described data transmission system, by performing each authentication and key sharing protocol, transmission data is encrypted and decoded using the encryption keys Kiso and K'iso and the encryption keys Kasync and K'async, shared between the data transmission apparatus 10 and the data receiving apparatus 20. However, it is possible to separately prepare encryption keys (contents key) for encrypting and decoding the actually transmitted data and to share the contents keys between the data transmission apparatus 10 and the data receiving apparatus 20 by using the encryption keys Kiso and K'iso and the encryption keys Kasync and K'async.

As is described above, in the present embodiment, via an interface having a first transmission mode in which a transmission band is ensured and a second transmission mode in which a transmission band is not ensured, data requiring the assurance of a transmission band is transmitted in the first transmission mode and related data relating to the data is transmitted in the second transmission mode. Thus, the data can be transmitted reliably by employing the two types of transmission modes, that is, transmission mode in which a transmission band is secured and the transmission mode in which a transmission band is not secured.

Also, the data requiring the assurance of a transmission band is encrypted by a first encryption key and then transmitted in the first transmission mode, and the related data relating to the data is encrypted by a second encryption key and then transmitted in the second transmission mode. Thus, the data requiring the assurance of a transmission band and the related data relating to the data can be transmitted safely.

Moreover, prior to data transmission, by executing a protocol for mutual authentication and sharing of a plurality of encryption keys between the data transmission apparatus and the data receiving apparatus, the data transmission apparatus and the data receiving apparatus can authenticate the validity of each other and share the encryption keys. Thus, the data requiring the assurance of a transmission band and the related data relating to the data can be transmitted safely and reliably.

The invention claimed is:

1. An information processing system comprising:

a first information processing apparatus and a second information processing apparatus, the first information processing apparatus comprising an interface having an isochronous transmission mode in which a transmission band is ensured, and a transmission control means for controlling encrypted data in the transmission band, wherein the encrypted data is encrypted using an encryption key, the encryption key being formed based on a first random number generated by the first information processing apparatus and a second random number generated by the second information processing apparatus, the second random number being different from the first random number, and then the encrypted data is transmitted in the isochronous transmission mode via the interface, and the transmission control means executes, prior to data transmission, a protocol for performing mutual authentication and sharing a plurality of encryption keys with the second information processing apparatus, to which the encrypted data is to be transmitted, and from which an authentication request is to be received, and the first information processing apparatus encrypts the data following said authentication request from the second information processing apparatus; and the second information processing apparatus comprising an interface having the isochronous transmission mode in which a transmission band is ensured, and a receiving control means for controlling reception of encrypted data received by the second information processing apparatus from the first information processing apparatus, wherein the encrypted data which is received in the isochronous transmission mode via the interface is decrypted using the encryption key, the receiving control means executes, prior to data reception, a protocol for performing mutual authentication and sharing a plurality of encryption keys with the first information processing apparatus, from which the encrypted data is to be received, and to which an authentication request is to be transmitted, the second information processing apparatus decrypts the encrypted data following an authentication request to the first information processing apparatus, the second information processing apparatus generates two random numbers and transmits them to the first information processing apparatus, the first information processing apparatus generates two random numbers and transmits them to the second information processing apparatus, the first information processing apparatus generates an encryption key used for encrypting the data to be transmitted in the isochronous transmission mode and an encryption key used for encrypting data to be transmitted in a second transmission mode on the basis of information indicating the validity of the apparatus itself, the generated random number and the received random number, the second information processing apparatus generates an encryption key used for decrypting the data transmitted in the isochronous transmission mode and an encryption key used for decrypting the data transmitted in the second transmission mode on the basis of information indicating the validity of the apparatus itself, the generated random number and the received random number, the first information processing apparatus transmits data P generated on the basis of the information indicating the validity of the apparatus itself, the generated random number and the received random number, to the second information processing apparatus, the second information processing apparatus transmits data Q generated on the basis of the information indicating the validity of the apparatus itself, the generated random number and the received random number, to the first information processing apparatus, the first information processing apparatus generates an encryption key used for encrypting the data to be transmitted in the isochronous transmission mode and an encryption key used for encrypting the data to be transmitted in the second transmission mode in the case where data Q' generated on the basis of the information indicating the validity of the apparatus itself, the generated random number and the received random number is coincident with the received data Q, the second information processing apparatus generates an encryption key used for decrypting the data transmitted in the isochronous transmission mode and an encryption key used for decrypting the data transmitted in the second transmission mode in the case where data P' generated on the basis of the information indicating the validity of the apparatus itself, the generated random number and the received random number is coincident with the received data P, the second information processing apparatus generates two random numbers R1 and R2 and transmits them to the first information processing apparatus, the first information processing apparatus generates two random numbers S1 and S2 and transmits them to the second information processing apparatus, the first information processing apparatus transmits data P generated on the basis of information indicating the validity of the apparatus itself, the generated random number S2 and the received random number R2, to the second information processing apparatus, the second information processing apparatus transmits data Q generated on the basis of information indicating the validity of the apparatus itself, the received random number S1 and the generated random number R1, to the first information processing apparatus, the first information processing apparatus generates an encryption key K1 used for encrypting the data to be transmitted in the isochronous transmission mode and an encryption key K2 used for encrypting the data to be transmitted in the second transmission mode in the case where data Q' generated on the basis of the information indicating the validity of the apparatus itself, the generated random number S1 and the received random number R1 is coincident with the received data Q, the second information processing apparatus generates an encryption key K'1 used for decrypting the data transmitted m the isochronous transmission mode and an encryption key K'2 used for decrypting the data transmitted in the second transmission mode in the case where data P' generated on the basis of the information indicating the validity of the apparatus itself, the received random number S2 and the generated random number R2 is coincident with the received data P, the first information processing apparatus generates the encryption key K1 used for encrypting the data to be transmitted in the isochronous transmission mode, on the basis of the result of calculation of a unidirectional function using the information indicating the validity of the apparatus itself, the generated random number S1 and the received random number R1, and generates the encryption key K2 used for encrypting the data to be transmitted in the second transmission mode, on the basis of the result of calculation of a unidirectional function using the information indicating the validity of the apparatus itself, the generated random number S2 and the received random number R2, and the second information processing apparatus generates the encryption key K'1 used for decrypting the data transmitted in the isochronous transmission mode, on the basis of the result of calculation of a unidirectional function using the information indicating the validity of the apparatus itself, the received random number S1 and the generated random number R1, and generates the encryption key K'2 used for decrypting the data transmitted in the second transmission mode, on the basis of the result of calculation of a unidirectional function using the information indicating the validity of the apparatus itself, the received random number S2 and the generated random number R2.

2. The information processing system as claimed in claim 1, wherein the first information processing apparatus transmits data P generated on the basis of the result of calculation of a unidirectional function using the information indicating the validity of the apparatus itself, the generated random number S2 and the received random number R2, to the second information processing apparatus, the second information processing apparatus transmits data Q generated on the basis of the result of calculation of a unidirectional function using the information indicating the validity of the apparatus itself, the received random number S1 and the generated random number R1, to the second information processing apparatus, the first information processing apparatus generates the encryption key K1 used for encrypting the data to be transmitted in the isochronous transmission mode and the encryption key K2 used for encrypting the data to be transmitted in the second transmission mode in the case where data Q' generated on the basis of the result of calculation of a unidirectional function using the information indicating the validity of the apparatus itself, the generated random number S1 and the received random number R1 is coincident with the received data Q, and the second information processing apparatus generates the encryption key K'1 used for decrypting the data transmitted in the isochronous transmission mode and the encryption key K'2 used for decrypting the data transmitted in the second transmission mode in the case where data P' generated on the basis of the result of calculation of a unidirectional function using the information indicating the validity of the apparatus itself, the received random number S2 and the generated random number R2 is coincident with the received data P.

3. The information processing system as claimed in claim 1, wherein the first information processing apparatus and the second information processing apparatus generate the encryption key K1, the encryption key K2, the encryption key K'1 and the encryption key K'2, using a bit value of a part of the result of calculation of the unidirectional function.

4. The information processing system as claimed in claim 3, wherein the first information processing apparatus and the second information processing apparatus generate the data P, the data Q', the data Q and the data P', using a bit value of a part of the result of calculation of the unidirectional function.

5. The information processing system as claimed in claim 4, wherein the first information processing apparatus and the second information processing apparatus generate the encryption key K1, the encryption key K2, the encryption key K'1 and the encryption key K'2, using a least significant n bits of the result of calculation of the unidirectional function.

6. The information processing system as claimed in claim 5, wherein the first information processing apparatus and the second information processing apparatus generate the data P, the data Q', the data Q and the data P', using a most significant m bits of the result of calculation of the unidirectional function.

7. An information processing system comprising:

a first information processing apparatus and a second information processing apparatus, the first information processing apparatus comprising an interface having an isochronous transmission mode in which a transmission band is ensured, and a transmission control means for controlling encrypted data in the transmission band, wherein the encrypted data is encrypted using an encryption key, the encryption key being formed based on a first random number generated by the first information processing apparatus and a second random number generated by the second information processing apparatus, the second random number being different from the first random number, and then the encrypted data is transmitted in the isochronous transmission mode via the interface, the transmission control means executes, prior to data transmission, a protocol for performing mutual authentication and sharing a plurality of encryption keys with the second information processing apparatus, to which the encrypted data is to be transmitted, and from which an authentication request is to be received, and the first information processing apparatus encrypts the data following said authentication request from the second information processing apparatus; and the second information processing apparatus comprising an interface having the isochronous transmission mode in which a transmission band is ensured, and a receiving control means for controlling reception of encrypted data received by the second information processing apparatus from the first information processing apparatus, wherein the encrypted data which is received in the isochronous transmission mode via the interface is decrypted using the encryption key, the receiving control means executes, prior to data reception, a protocol for performing mutual authentication and sharing a plurality of encryption keys with the first information processing apparatus, from which the encrypted data is to be received and to which an authentication request is to be transmitted, the second information processing apparatus decrypts the encrypted data following an authentication request to the first information processing apparatus, the second information processing apparatus generates two random numbers and transmits them to the first information processing apparatus, the first information processing apparatus generates two random numbers and transmits them to the second information processing apparatus, the first information processing apparatus generates an encryption key used for encrypting the data to be transmitted in the isochronous transmission mode and an encryption key used for encrypting data to be transmitted in a second transmission mode on the basis of information indicating the validity of the apparatus itself, the generated random number and the received random number, the second information processing apparatus generates an encryption key used for decrypting the data transmitted in the isochronous transmission mode and an encryption key used for decrypting the data transmitted in the second transmission mode on the basis of information indicating the validity of the apparatus itself, the generated random number and the received random number, the first information processing apparatus transmits data P generated on the basis of the information indicating the validity of the apparatus itself, the generated random number and the received random number, to the second information processing apparatus, the second information processing apparatus transmits data Q generated on the basis of the information indicating the validity of the apparatus itself, the generated random number and the received random number, to the first information processing apparatus, the first information processing apparatus generates an encryption key used for encrypting the data to be transmitted in the isochronous transmission mode and an encryption key used for encrypting the data to be transmitted in the second transmission mode in the case where data Q' generated on the basis of the information indicating the validity of the apparatus itself, the generated random number and the received random number is coincident with the received data Q, the second information processing apparatus generates an encryption key used for decrypting the data transmitted in the isochronous transmission mode and an encryption key used for decrypting the data transmitted in the second transmission mode in the case where data P' generated on the basis of the information indicating the validity of the apparatus itself, the generated random number and the received random number is coincident with the received data P, the second information processing apparatus generates two random numbers R1 and R2 and transmits them to the first information processing apparatus, the first information processing apparatus generates two random numbers S1 and S2 and transmits them to the second information processing apparatus, the first information processing apparatus transmits data P generated on the basis of information indicating the validity of the apparatus itself, the generated random number S2 and the received random number R2, to the second information processing apparatus, the second information processing apparatus transmits data Q generated on the basis of information indicating the validity of the apparatus itself, the received random number S1 and the generated random number R1, to the first information processing apparatus, the first information processing apparatus generates an encryption key K1 used for encrypting the data to be transmitted in the isochronous transmission mode and an encryption key K2 used for encrypting the data to be transmitted in the second transmission mode in the case where data Q' generated on the basis of the information indicating the validity of the apparatus itself, the generated random number S1 and the received random number R1 is coincident with the received data Q, the second information processing apparatus generates an encryption key K'1 used for decrypting the data transmitted m the isochronous transmission mode and an encryption key K'2 used for decrypting the data transmitted in the second transmission mode in the case where data P' generated on the basis of the information indicating the validity of the apparatus itself, the received random number S2 and the generated random number R2 is coincident with the received data P, the first information processing apparatus generates the encryption key K1 used for encrypting the data to be transmitted in the isochronous transmission mode, on the basis of the result of calculation of a unidirectional function with respect to concatenated data formed by concatenating the information indicating the validity of the apparatus itself, the generated random number S1 and the received random number R1, and generates the encryption key K2 used for encrypting the data to be transmitted in the second transmission mode, on the basis of the result of calculation of a unidirectional function with respect to concatenated data formed by concatenating the information indicating the validity of the apparatus itself, the generated random number S2 and the received random number R2, and the second information processing apparatus generates the encryption key K'1 used for decrypting the data transmitted in the isochronous transmission mode, on the basis of the result of calculation of a unidirectional function with respect to concatenated data formed by concatenating the information indicating the validity of the apparatus itself, the received random number S1 and the generated random number R1, and generates the encryption key K'2 used for decrypting the data transmitted in the second transmission mode, on the basis of the result of calculation of a unidirectional function with respect to concatenated data formed by concatenating the information indicating the validity of the apparatus itself, the received random number S2 and the generated random number R2.

8. The information processing system as claimed in claim 7, wherein the first information processing apparatus transmits data P generated on the basis of the result of calculation of a unidirectional function with respect to concatenated data formed by concatenating the information indicating the validity of the apparatus itself, the generated random number S2 and the received random number R2, to the second information processing apparatus, the second information processing apparatus transmits data Q generated on the basis of the result of calculation of a unidirectional function with respect to concatenated data formed by concatenating the information indicating the validity of the apparatus itself, the received random number S1 and the generated random number R1, to the first information processing apparatus, the first information processing apparatus generates the encryption key K1 used for encrypting the data to be transmitted in the isochronous transmission mode and the encryption key K2 used for encrypting the data to be transmitted in the second transmission mode in the case where data Q' generated on the basis of the result of calculation of a unidirectional function with respect to concatenated data formed by concatenating the information indicating the validity of the apparatus itself, the generated random number S1 and the received random number R1 is coincident with the received data Q, and the second information processing apparatus generates the encryption key K'1 used for decrypting the data transmitted in the isochronous transmission mode and the encryption key K'2 used for decrypting the data transmitted in the second transmission mode in the case where data P' generated on the basis of the result of calculation of a unidirectional function with respect to concatenated data formed by concatenating the information indicating the validity of the apparatus itself, the received random number S2 and the generated random number R2 is coincident with the received data P.

9. An information processing system comprising:

a first information processing apparatus and a second information processing apparatus, the first information processing apparatus comprising an interface having an isochronous transmission mode in which a transmission band is ensured, and a transmission control means for controlling encrypted data in the transmission band, wherein the encrypted data is encrypted using an encryption key, the encryption key being formed based on a first random number generated by the first information processing apparatus and a second random number generated by the second information processing apparatus, the second random number being different from the first random number, and then the encrypted data is transmitted in the isochronous transmission mode via the interface, the transmission control means executes, prior to data transmission, a protocol for performing mutual authentication and sharing a plurality of encryption keys with the second information processing apparatus, to which the encrypted data is to be transmitted, and from which an authentication request is to be received, and the first information processing apparatus encrypts the data following said authentication request from the second information processing apparatus; and the second information processing apparatus comprising an interface having the isochronous transmission mode in which a transmission band is ensured, and a receiving control means for controlling reception of encrypted data received by the second information processing apparatus from the first information processing apparatus, wherein the encrypted data which is received in the isochronous transmission mode via the interface is decrypted using the encryption key, the receiving control means executes, prior to data reception, a protocol for performing mutual authentication and sharing a plurality of encryption keys with the first information processing apparatus, from which the encrypted data is to be received, and to which an authentication request is to be transmitted, the second information processing apparatus decrypts the encrypted data following an authentication request to the first information processing apparatus, the second information processing apparatus generates two random numbers and transmits them to the first information processing apparatus, the first information processing apparatus generates two random numbers and transmits them to the second information processing apparatus, the first information processing apparatus generates an encryption key used for encrypting the data to be transmitted in the isochronous transmission mode and an encryption key used for encrypting data to be transmitted in a second transmission mode on the basis of information indicating the validity of the apparatus itself, the generated random number and the received random number, the second information processing apparatus generates an encryption key used for decrypting the data transmitted in the isochronous transmission mode and an encryption key used for decrypting the data transmitted in the second transmission mode on the basis of information indicating the validity of the apparatus itself, the generated random number and the received random number, the first information processing apparatus and the second information processing apparatus generate either one of the encryption key used for encrypting the data to be transmitted in the isochronous transmission mode and the encryption key used for encrypting the data to be transmitted in the second transmission mode, on the basis of the information indicating the validity of the apparatus itself, the generated random number and the received random number, and generate the encryption key of the other transmission mode on the basis of the generated encryption key, the generated random number and the received random number, the first information processing apparatus generates either one of the encryption key used for encrypting the data to be transmitted in the isochronous transmission mode and the encryption key used for encrypting the data to be transmitted in the second transmission mode, on the basis of the information indicating the validity of the apparatus itself, the received random number and the generated random number, and transmits data P generated on the basis of the generated encryption key, the received random number and the generated random number to the second information processing apparatus, the second information processing apparatus generates either one of the encryption key used for decrypting the data transmitted in the isochronous transmission mode and the encryption key used for decrypting the data transmitted in the second transmission mode, on the basis of the information indicating the validity of the apparatus itself, the received random number and the generated random number, and verifies whether or not data P' generated on the basis of the generated encryption key, the received random number and the generated random number is coincident with the received data P, and in the case where the data P' is coincident with the data P, transmits data Q generated on the basis of the information indicating the validity of the apparatus itself, the received random number and the generated random number to the first information processing apparatus and generates the encryption key of the transmission mode for which the encryption key is not generated yet, of the encryption keys used for decrypting the data transmitted in the isochronous transmission mode and the second transmission mode, on the basis of the encryption key of the transmission mode for which the encryption key is already generated, the received random number and the generated random number, the first information processing apparatus generates the encryption key of the transmission mode for which the encryption key is not yet generated, of the encryption keys used for decrypting the data transmitted in the isochronous transmission mode and the second transmission mode, on the basis of the encryption key of the transmission mode for which the encryption key is already generated, the received random number and the generated random number, in the case where data Q' generated on the basis of the information indicating the validity of the apparatus itself, the received random number and the generated random number is coincident with the received data Q, the second information processing apparatus generates two random numbers R1 and R2 and transmits them to the first information processing apparatus, the first information processing apparatus generates two random numbers S1 and S2 and transmits them to the second information processing apparatus, the first information processing apparatus generates one encryption key K1 of the encryption key used for encrypting the data to be transmitted in the isochronous transmission mode and the encryption key used for encrypting the data to be transmitted in the second transmission mode, on the basis of the information indicating the validity of the apparatus itself, the received random number R1 and the generated random number S1, and transmits data P generated on the basis of the generated encryption key K1, the received random number R1 and the generated random number S2 to the second information processing apparatus, the second information processing apparatus generates one encryption key K'1 of the encryption key used for decrypting the data transmitted in the isochronous transmission mode and the encryption key used for decrypting the data transmitted in the second transmission mode, on the basis of the information indicating the validity of the apparatus itself, the received random number S1 and the generated random number R1, and verifies whether or not data P' generated on the basis of the generated encryption key K'1, the received random number S2 and the generated random number R2 is coincident with the received data P, and in the case where the data P' is coincident with the data P, transmits data Q generated on the basis of the information indicating the validity of the apparatus itself, the received random number S1 and the generated random number R1 to the first information processing apparatus and generates the encryption key K'2 of the transmission mode for which the encryption key is not generated yet, of the encryption keys used for decrypting the data transmitted in the isochronous transmission mode and the second transmission mode, on the basis of the encryption key K'1 of the transmission mode for which the encryption key is already generated, the received random number S2 and the generated random number R2, the first information processing apparatus generates the encryption key K2 of the transmission mode for which the encryption key is not yet generated, of the encryption keys used for decrypting the data transmitted in the isochronous transmission mode and the second transmission mode, on the basis of the encryption key K1 of the transmission mode for which the encryption key is already generated, the received random number R2 and the generated random number S2, in the case where data Q'generated on the basis of the information indicating the validity of the apparatus itself, the received random number R1 and the generated random number S1 is coincident with the received data Q, the first information processing apparatus generates the encryption key K1 on the basis of the result of calculation of a unidirectional function using the information indicating the validity of the apparatus itself, the received random number R1 and the generated random number S1, and generates the encryption key K2 on the basis of the result of calculation of a unidirectional function using the generated encryption key K1, the received random number R2 and the generated random number S2, and the second information processing apparatus generates the encryption key K'1 on the basis of the result of calculation of a unidirectional function using the information indicating the validity of the apparatus itself, the received random number S1 and the generated random number R1, and generates the encryption key K'2 on the basis of the result of calculation of a unidirectional function using the generated encryption key K'1, the received random number S2 and the generated random number R2.

10. The information processing system as claimed in claim 9, wherein the first information processing apparatus transmits data P generated on the basis of the result of calculation of the unidirectional function using the generated encryption key K1, the received random number R2 and the generated random number S2 to the second information processing apparatus, the second information apparatus verifies whether or not data P' generated on the basis of the result of calculation of the unidirectional function using the generated encryption key K'1, the received random number S2 and the generated random number R2 is coincident with the received data P, and in the case where the data P' is coincident with the data P, transmits data Q generated on the basis of the result of calculation of the unidirectional function using the information indicating the validity of the apparatus itself, the received random number S1 and the generated random number R1 to the first information processing apparatus, and the first information processing apparatus generates the encryption key K2 in the case where data Q' generated on the basis of the result of calculation of the unidirectional function using the information indicating the validity of the apparatus itself, the received random number R1 and the generated random number S1 is coincident with the received data Q.

11. The information processing system as claimed in claim 9, wherein the first information processing apparatus and the second information processing apparatus generate the encryption key K1, the encryption key K2, the encryption key K'1 and the encryption key K'2, using a bit value of a part of the result of calculation of the unidirectional function.

12. The information processing system as claimed in claim 11, wherein the first information processing apparatus and the second information processing apparatus generate the data P, the data Q', the data Q and the data P', using a bit value of a part of the result of calculation of the unidirectional function.

13. The information processing system as claimed in claim 11, wherein the first information processing apparatus and the second information processing apparatus generate the encryption key K1, the encryption key K2, the encryption key K'1 and the encryption key K'2, using the least significant n bits of the result of calculation of the unidirectional function.

14. The information processing system as claimed in claim 13, wherein the first information processing apparatus and the second information processing apparatus generate the data P, the data Q', the data Q and the data P', using the most significant m bits of the result of calculation of the unidirectional function.

15. An information processing system comprising:

a first information processing apparatus and a second information processing apparatus, the first information processing apparatus comprising an interface having an isochronous transmission mode in which a transmission band is ensured, and a transmission control means for controlling encrypted data in the transmission band, wherein the encrypted data is encrypted using an encryption key, the encryption key being formed based on a first random number generated by the first information processing apparatus and a second random number generated by the second information processing apparatus, the second random number being different from the first random number, and then the encrypted data is transmitted in the isochronous transmission mode via the interface, the transmission control means executes, prior to data transmission, a protocol for performing mutual authentication and sharing a plurality of encryption keys with the second information processing apparatus, to which the encrypted data is to be transmitted, and from which an authentication request is to be received, and the first information processing apparatus encrypts the data following said authentication request from the second information processing apparatus; and the second information processing apparatus comprising an interface having the isochronous transmission mode in which a transmission band is ensured, and a receiving control means for controlling reception of encrypted data received by the second information processing apparatus from the first information processing apparatus, wherein the encrypted data which is received in the isochronous transmission mode via the interface is decrypted using the encryption key, the receiving control means executes, prior to data reception, a protocol for performing mutual authentication and sharing a plurality of encryption keys with the first information processing apparatus, from which the encrypted data is to be received, and to which an authentication request is to be transmitted, the second information processing apparatus decrypts the encrypted data following an authentication request to the first information processing apparatus, the second information processing apparatus generates two random numbers and transmits them to the first information processing apparatus, the first information processing apparatus generates two random numbers and transmits them to the second information processing apparatus, the first information processing apparatus generates an encryption key used for encrypting the data to be transmitted in the isochronous transmission mode and an encryption key used for encrypting data to be transmitted in a second transmission mode on the basis of information indicating the validity of the apparatus itself, the generated random number and the received random number, the second information processing apparatus generates an encryption key used for decrypting the data transmitted in the isochronous transmission mode and an encryption key used for decrypting the data transmitted in the second transmission mode on the basis of information indicating the validity of the apparatus itself, the generated random number and the received random number, the first information processing apparatus and the second information processing apparatus generate either one of the encryption key used for encrypting the data to be transmitted in the isochronous transmission mode and the encryption key used for encrypting the data to be transmitted in the second transmission mode, on the basis of the information indicating the validity of the apparatus itself, the generated random number and the received random number, and generate the encryption key of the other transmission mode on the basis of the generated encryption key, the generated random number and the received random number, the first information processing apparatus generates either one of the encryption key used for encrypting the data to be transmitted in the isochronous transmission mode and the encryption key used for encrypting the data to be transmitted in the second transmission mode, on the basis of the information indicating the validity of the apparatus itself, the received random number and the generated random number, and transmits data P generated on the basis of the generated encryption key, the received random number and the generated random number to the second information processing apparatus, the second information processing apparatus generates either one of the encryption key used for decrypting the data transmitted in the isochronous transmission mode and the encryption key used for decrypting the data transmitted in the second transmission mode, on the basis of the information indicating the validity of the apparatus itself, the received random number and the generated random number, and verifies whether or not data P' generated on the basis of the generated encryption key, the received random number and the generated random number is coincident with the received data P, and in the case where the data P' is coincident with the data P, transmits data Q generated on the basis of the information indicating the validity of the apparatus itself, the received random number and the generated random number to the first information processing apparatus and generates the encryption key of the transmission mode for which the encryption key is not generated yet, of the encryption keys used for decrypting the data transmitted in the isochronous transmission mode and the second transmission mode, on the basis of the encryption key of the transmission mode for which the encryption key is already generated, the received random number and the generated random number, the first information processing apparatus generates the encryption key of the transmission mode for which the encryption key is not yet generated, of the encryption keys used for decrypting the data transmitted in the isochronous transmission mode and the second transmission mode, on the basis of the encryption key of the transmission mode for which the encryption key is already generated, the received random number and the generated random number, in the case where data Q' generated on the basis of the information indicating the validity of the apparatus itself, the received random number and the generated random number is coincident with the received data Q, the second information processing apparatus generates two random numbers R1 and R2 and transmits them to the first information processing apparatus, the first information processing apparatus generates two random numbers S1 and S2 and transmits them to the second information processing apparatus, the first information processing apparatus generates one encryption key K1 of the encryption key used for encrypting the data to be transmitted in the isochronous transmission mode and the encryption key used for encrypting the data to be transmitted in the second transmission mode, on the basis of the information indicating the validity of the apparatus itself, the received random number R1 and the generated random number S1, and transmits data P generated on the basis of the generated encryption key K1, the received random number R1 and the generated random number S2 to the second information processing apparatus, the second information processing apparatus generates one encryption key K'1 of the encryption key used for decrypting the data transmitted in the isochronous transmission mode and the encryption key used for decrypting the data transmitted in the second transmission mode, on the basis of the information indicating the validity of the apparatus itself, the received random number S1 and the generated random number R1, and verifies whether or not data P' generated on the basis of the generated encryption key K'1, the received random number S2 and the generated random number R2 is coincident with the received data P, and in the case where the data P' is coincident with the data P, transmits data Q generated on the basis of the information indicating the validity of the apparatus itself, the received random number S1 and the generated random number R1 to the first information processing apparatus and generates the encryption key K'2 of the transmission mode for which the encryption key is not generated yet, of the encryption keys used for decrypting the data transmitted in the isochronous transmission mode and the second transmission mode, on the basis of the encryption key K'1 of the transmission mode for which the encryption key is already generated, the received random number S2 and the generated random number R2, the first information processing apparatus generates the encryption key K2 of the transmission mode for which the encryption key is not yet generated, of the encryption keys used for decrypting the data transmitted in the isochronous transmission mode and the second transmission mode, on the basis of the encryption key K1 of the transmission mode for which the encryption key is already generated, the received random number R2 and the generated random number S2, in the case where data Q'generated on the basis of the information indicating the validity of the apparatus itself, the received random number R1 and the generated random number S1 is coincident with the received data Q, the first information processing apparatus generates the encryption key K1 on the basis of the result of calculation of a unidirectional function with respect to concatenated data formed by concatenating the information indicating the validity of the apparatus itself, the received random number R1 and the generated random number, and generates the encryption key K2 on the basis of the result of calculation of a unidirectional function with respect to concatenated data formed by concatenating the information indicating the generated encryption key K1, the received random number R2 and the generated random number S2, and the second information processing apparatus generates the encryption key K'1 on the basis of the result of calculation of a unidirectional function with respect to concatenated data formed by concatenating the information indicating the validity of the apparatus itself, the received random number S1 and the generated random number R1, and generates the encryption key K'2 on the basis of the result of calculation of a unidirectional function with respect to concatenated data formed by concatenating the generated encryption key K'1, the received random number S2 and the generated random number R2.

16. The information processing system as claimed in claim 15, wherein the first information processing apparatus transmits data P generated on the basis of the result of calculation of the unidirectional function with respect to concatenated data formed by concatenating the generated encryption key K1, the received random number R2 and the generated random number S2 to the second information processing apparatus, the second information apparatus verifies whether or not data P' generated on the basis of the result of calculation of the unidirectional function with respect to concatenated data formed by concatenating the generated encryption key K'1, the received random number S2 and the generated random number R2 is coincident with the received data P, and in the case where the data P' is coincident with the data P, transmits data Q generated on the basis of the result of calculation of the unidirectional function with respect to concatenated data formed by concatenating the information indicating the validity of the apparatus itself, the received random number S1 and the generated random number R1 to the first information processing apparatus, and the first information processing apparatus generates the encryption key K2 in the case where data Q' generated on the basis of the result of calculation of the unidirectional function with respect to concatenated data formed by concatenating the information indicating the validity of the apparatus itself, the received random number R1 and the generated random number S1 is coincident with the received data Q.

17. An information processing method for performing data transmission between a first information processing apparatus and a second information processing apparatus via an interface having an isochronous transmission mode in which a transmission band is ensured, the method comprising the steps of:

encrypting data from the first information processing apparatus using an encryption key, the encryption key being formed based on a first random number generated by the first information processing apparatus and a second random number generated by the second information processing apparatus, the second random number being different from the first random number, and then transmitting the encrypted data in the isochronous transmission mode; and decrypting, using the encryption key on the side of the second information processing apparatus, the encrypted data which is received in the isochronous transmission mode, wherein the second information processing apparatus generates two random numbers and transmits them to the first information processing apparatus, the first information processing apparatus generates two random numbers and transmits them to the second information processing apparatus, the first information processing apparatus generates an encryption key used for encrypting the data to be transmitted in the isochronous transmission mode and an encryption key used for encrypting data to be transmitted in a second transmission mode on the basis of information indicating the validity of the apparatus itself, the generated random number and the received random number, the second information processing apparatus generates an encryption key used for decrypting the data transmitted in the isochronous transmission mode and an encryption key used for decrypting the data transmitted in the second transmission mode on the basis of information indicating the validity of the apparatus itself, the generated random number and the received random number, the first information processing apparatus transmits data P generated on the basis of the information indicating the validity of the apparatus itself, the generated random number and the received random number, to the second information processing apparatus, the second information processing apparatus transmits data Q generated on the basis of the information indicating the validity of the apparatus itself, the generated random number and the received random number, to the first information processing apparatus, the first information processing apparatus generates an encryption key used for encrypting the data to be transmitted in the isochronous transmission mode and an encryption key used for encrypting the data to be transmitted in the second transmission mode in the case where data Q' generated on the basis of the information indicating the validity of the apparatus itself, the generated random number and the received random number is coincident with the received data Q, the second information processing apparatus generates an encryption key used for decrypting the data transmitted in the isochronous transmission mode and an encryption key used for decrypting the data transmitted in the second transmission mode in the case where data P' generated on the basis of the information indicating the validity of the apparatus itself, the generated random number and the received random number is coincident with the received data P, the second information processing apparatus generates two random numbers R1 and R2 and transmits them to the first information processing apparatus, the first information processing apparatus generates two random numbers S1 and S2 and transmits them to the second information processing apparatus, the first information processing apparatus transmits data P generated on the basis of information indicating the validity of the apparatus itself, the generated random number S2 and the received random number R2, to the second information processing apparatus, the second information processing apparatus transmits data Q generated on the basis of information indicating the validity of the apparatus itself, the received random number S1 and the generated random number R1, to the first information processing apparatus, the first information processing apparatus generates an encryption key K1 used for encrypting the data to be transmitted in the isochronous transmission mode and an encryption key K2 used for encrypting the data to be transmitted in the second transmission mode in the case where data Q' generated on the basis of the information indicating the validity of the apparatus itself, the generated random number S1 and the received random number R1 is coincident with the received data Q, the second information processing apparatus generates an encryption key K'1 used for decrypting the data transmitted in the isochronous transmission mode and an encryption key K'2 used for decrypting the data transmitted in the second transmission mode in the case where data P' generated on the basis of the information indicating the validity of the apparatus itself, the received random number S2 and the generated random number R2 is coincident with the received data P, the first information processing apparatus generates the encryption key K1 used for encrypting the data to be transmitted in the isochronous transmission mode, on the basis of the result of calculation of a unidirectional function using the information indicating the validity of the apparatus itself, the generated random number S1 and the received random number R1, and generates the encryption key K2 used for encrypting the data to be transmitted in the second transmission mode, on the basis of the result of calculation of a unidirectional function using the information indicating the validity of the apparatus itself, the generated random number S2 and the received random number R2, and the second information processing apparatus generates the encryption key K'1 used for decrypting the data transmitted in the isochronous transmission mode, on the basis of the result of calculation of a unidirectional function using the information indicating the validity of the apparatus itself, the received random number S1 and the generated random number R1, and generates the encryption key K'2 used for decrypting the data transmitted in the second transmission mode, on the basis of the result of calculation of a unidirectional function using the information indicating the validity of the apparatus itself, the received random number S2 and the generated random number R2.

18. The information processing method as claimed in claim 17, wherein the first information processing apparatus transmits data P generated on the basis of the result of calculation of a unidirectional function using the information indicating the validity of the apparatus itself, the generated random number S2 and the received random number R2, to the second information processing apparatus, the second information processing apparatus transmits data Q generated on the basis of the result of calculation of a unidirectional function using the information indicating the validity of the apparatus itself, the received random number S1 and the generated random number R1, to the first information processing apparatus, the first information processing apparatus generates the encryption key K1 used for encrypting the data to be transmitted in the isochronous transmission mode and the encryption key K2 used for encrypting the data to be transmitted in the second transmission mode in the case where data Q' generated on the basis of the result of calculation of a unidirectional function using the information indicating the validity of the apparatus itself, the generated random number S1 and the received random number R1 is coincident with the received data Q, and the second information processing apparatus generates the encryption key K'1 used for decrypting the data transmitted in the isochronous transmission mode and the encryption key K'2 used for decrypting the data transmitted in the second transmission mode in the case where data P' generated on the basis of the result of calculation of a unidirectional function using the information indicating the validity of the apparatus itself, the received random number S2 and the generated random number P2 is coincident with the received data P.

19. The information processing method as claimed in claim 17, wherein the first information processing apparatus and the second information processing apparatus generate the encryption key K1, the encryption key K2, the encryption key K'1 and the encryption key K'2, using a bit value of a part of the result of calculation of the unidirectional function.

20. The information processing method as claimed in claim 19, wherein the first information processing apparatus and the second information processing apparatus generate the data P, the data Q', the data Q and the data P', using a bit value of a part of the result of calculation of the unidirectional function.

21. The information processing method as claimed in claim 19, wherein the first information processing apparatus and the second information processing apparatus generate the encryption key K1, the encryption key K2, the encryption key K'1 and the encryption key K2, using the least significant n bits of the result of calculation of the unidirectional function.

22. The information processing method as claimed in claim 21, wherein the first information processing apparatus and the second information processing apparatus generate the data P, the data Q', the data Q and the data P', using the most significant m bits of the result of calculation of the unidirectional function.

23. An information processing method for performing data transmission between a first information processing apparatus and a second information processing apparatus via an interface having an isochronous transmission mode in which a transmission band is ensured, the method comprising the steps of:

encrypting data from the first information processing apparatus using an encryption key, the encryption key being formed based on a first random number generated by the first information processing apparatus and a second random number generated by the second information processing apparatus, the second random number being different from the first random number, and then transmitting the encrypted data in the isochronous transmission mode; and decrypting, using the encryption key on the side of the second information processing apparatus, the encrypted data which is received in the isochronous transmission mode, wherein the second information processing apparatus generates two random numbers and transmits them to the first information processing apparatus, the first information processing apparatus generates two random numbers and transmits them to the second information processing apparatus, the first information processing apparatus generates an encryption key used for encrypting the data to be transmitted in the isochronous transmission mode and an encryption key used for encrypting data to be transmitted in a second transmission mode on the basis of information indicating the validity of the apparatus itself, the generated random number and the received random number, the second information processing apparatus generates an encryption key used for decrypting the data transmitted in the isochronous transmission mode and an encryption key used for decrypting the data transmitted in the second transmission mode on the basis of information indicating the validity of the apparatus itself, the generated random number and the received random number, the first information processing apparatus transmits data P generated on the basis of the information indicating the validity of the apparatus itself, the generated random number and the received random number, to the second information processing apparatus, the second information processing apparatus transmits data Q generated on the basis of the information indicating the validity of the apparatus itself, the generated random number and the received random number, to the first information processing apparatus, the first information processing apparatus generates an encryption key used for encrypting the data to be transmitted in the isochronous transmission mode and an encryption key used for encrypting the data to be transmitted in the second transmission mode in the case where data Q' generated on the basis of the information indicating the validity of the apparatus itself, the generated random number and the received random number is coincident with the received data Q, the second information processing apparatus generates an encryption key used for decrypting the data transmitted in the isochronous transmission mode and an encryption key used for decrypting the data transmitted in the second transmission mode in the case where data P' generated on the basis of the information indicating the validity of the apparatus itself, the generated random number and the received random number is coincident with the received data P, the second information processing apparatus generates two random numbers R1 and R2 and transmits them to the first information processing apparatus, the first information processing apparatus generates two random numbers S1 and S2 and transmits them to the second information processing apparatus, the first information processing apparatus transmits data P generated on the basis of information indicating the validity of the apparatus itself, the generated random number S2 and the received random number R2, to the second information processing apparatus, the second information processing apparatus transmits data Q generated on the basis of information indicating the validity of the apparatus itself, the received random number S1 and the generated random number R1, to the first information processing apparatus, the first information processing apparatus generates an encryption key K1 used for encrypting the data to be transmitted in the isochronous transmission mode and an encryption key K2 used for encrypting the data to be transmitted in the second transmission mode in the case where data Q' generated on the basis of the information indicating the validity of the apparatus itself, the generated random number S1 and the received random number R I is coincident with the received data Q, the second information processing apparatus generates an encryption key K'1 used for decrypting the data transmitted in the isochronous transmission mode and an encryption key K'2 used for decrypting the data transmitted in the second transmission mode in the case where data P' generated on the basis of the information indicating the validity of the apparatus itself, the received random number S2 and the generated random number R2 is coincident with the received data P, the first information processing apparatus generates the encryption key K1 used for encrypting the data to be transmitted in the isochronous transmission mode, on the basis of the result of calculation of a unidirectional function with respect to concatenated data formed by concatenating the information indicating the validity of the apparatus itself, the generated random number S1 and the received random number R1, and generates the encryption key K2 used for encrypting the data to be transmitted in the second transmission mode, on the basis of the result of calculation of a unidirectional function with respect to concatenated data formed by concatenating the information indicating the validity of the apparatus itself, the generated random number S2 and the received random number R2, and the second information processing apparatus generates the encryption key K'1 used for decrypting the data transmitted in the isochronous transmission mode, on the basis of the result of calculation of a unidirectional function with respect to concatenated data formed by concatenating the information indicating the validity of the apparatus itself, the received random number S1 and the generated random number R1, and generates the encryption key K'2 used for decrypting the data transmitted in the second transmission mode, on the basis of the result of calculation of a unidirectional function with respect to concatenated data formed by concatenating the information indicating the validity of the apparatus itself, the received random number S2 and the generated random number R2.

24. The information processing method as claimed in claim 23, wherein the first information processing apparatus transmits data P generated on the basis of the result of calculation of a unidirectional function with respect to concatenated data formed by concatenating the information indicating the validity of the apparatus itself, the generated random number S2 and the received random number R2, to the second information processing apparatus, the second information processing apparatus transmits data Q generated on the basis of the result of calculation of a unidirectional function with respect to concatenated data formed by concatenating the information indicating the validity of the apparatus itself, the received random number S1 and the generated random number R1, to the first information processing apparatus, the first information processing apparatus generates the encryption key K1 used for encrypting the data to be transmitted in the isochronous transmission mode and the encryption key K2 used for encrypting the data to be transmitted in the second transmission mode in the case where data Q' generated on the basis of the result of calculation of a unidirectional function with respect to concatenated data formed by concatenating the information indicating the validity of the apparatus itself, the generated random number S1 and the received random number R1 is coincident with the received data Q, and the second information processing apparatus generates the encryption key K'1 used for decrypting the data transmitted in the isochronous transmission mode and the encryption key K'2 used for decrypting the data transmitted in the second transmission mode in the case where data P' generated on the basis of the result of calculation of a unidirectional function with respect to concatenated data formed by concatenating the information indicating the validity of the apparatus itself, the received random number S2 and the generated random number R2 is coincident with the received data P.

25. An information processing method for performing data transmission between a first information processing apparatus and a second information processing apparatus via an interface having an isochronous transmission mode in which a transmission band is ensured, the method comprising the steps of:

encrypting data from the first information processing apparatus using an encryption key, the encryption key being formed based on a first random number generated by the first information processing apparatus and a second random number generated by the second information processing apparatus, the second random number being different from the first random number, and then transmitting the encrypted data in the isochronous transmission mode; and decrypting, using the encryption key on the side of the second information processing apparatus, the encrypted data which is received in the isochronous transmission mode, wherein the second information processing apparatus generates two random numbers and transmits them to the first information processing apparatus, the first information processing apparatus generates two random numbers and transmits them to the second information processing apparatus, the first information processing apparatus generates an encryption key used for encrypting the data to be transmitted in the isochronous transmission mode and an encryption key used for encrypting data to be transmitted in a second transmission mode on the basis of information indicating the validity of the apparatus itself, the generated random number and the received random number, the second information processing apparatus generates an encryption key used for decrypting the data transmitted in the isochronous transmission mode and an encryption key used for decrypting the data transmitted in the second transmission mode on the basis of information indicating the validity of the apparatus itself, the generated random number and the received random number, the first information processing apparatus and the second information processing apparatus generate either one of the encryption key used for encrypting the data to be transmitted in the isochronous transmission mode and the encryption key used for encrypting the data to be transmitted in the second transmission mode, on the basis of the information indicating the validity of the apparatus itself, the generated random number and the received random number, and generate the encryption key of the other transmission mode on the basis of the generated encryption key, the generated random number and the received random number, the first information processing apparatus generates either one of the encryption key used for encrypting the data to be transmitted in the isochronous transmission mode and the encryption key used for encrypting the data to be transmitted in the second transmission mode, on the basis of the information indicating the validity of the apparatus itself, the received random number and the generated random number, and transmits data P generated on the basis of the generated encryption key, the received random number and the generated random number to the second information processing apparatus, the second information processing apparatus generates either one of the encryption key used for decrypting the data transmitted in the isochronous transmission mode and the encryption key used for decrypting the data transmitted in the second transmission mode, on the basis of the information indicating the validity of the apparatus itself, the received random number and the generated random number, and verifies whether or not data P' generated on the basis of the generated encryption key, the received random number and the generated random number is coincident with the received data P, and in the case where the data P' is coincident with the data P, transmits data Q generated on the basis of the information indicating the validity of the apparatus itself, the received random number and the generated random number to the first information processing apparatus and generates the encryption key of the transmission mode for which the encryption key is not generated yet, of the encryption keys used for decrypting the data transmitted in the isochronous transmission mode and the second transmission mode, on the basis of the encryption key of the transmission mode for which the encryption key is already generated, the received random number and the generated random number, the first information processing apparatus generates the encryption key of the transmission mode for which the encryption key is not yet generated, of the encryption keys used for decrypting the data transmitted in the isochronous transmission mode and the second transmission mode, on the basis of the encryption key of the transmission mode for which the encryption key is already generated, the received random number and the generated random number, in the case where data Q' generated on the basis of the information indicating the validity of the apparatus itself, the received random number and the generated random number is coincident with the received data Q, the second information processing apparatus generates two random numbers R1 and R2 and transmits them to the first information processing apparatus, the first information processing apparatus generates two random numbers S1 and S2 and transmits them to the second information processing apparatus, the first information processing apparatus generates one encryption key K1 of the encryption key used for encrypting the data to be transmitted in the isochronous transmission mode and the encryption key used for encrypting the data to be transmitted in the second transmission mode, on the basis of the information indicating the validity of the apparatus itself, the received random number R1 and the generated random number S1, and transmits data P generated on the basis of the generated encryption key K1, the received random number R2 and the generated random number S2 to the second information processing apparatus, the second information processing apparatus generates one encryption key K'1 of the encryption key used for decrypting the data transmitted in the isochronous transmission mode and the encryption key used for decrypting the data transmitted in the second transmission mode, on the basis of the information indicating the validity of the apparatus itself, the received random number S1 and the generated random number R1, and verifies whether or not data P' generated on the basis of the generated encryption key K'1, the received random number S2 and the generated random number R2 is coincident with the received data P, and in the case where the data P' is coincident with the data P, transmits data Q generated on the basis of the information indicating the validity of the apparatus itself, the received random number S1 and the generated random number R1 to the first information processing apparatus and generates the encryption key K'2 of the transmission mode for which the encryption key is not generated yet, of the encryption keys used for decrypting the data transmitted in the isochronous transmission mode and the second transmission mode, on the basis of the encryption key K'1 of the transmission mode for which the encryption key is already generated, the received random number S2 and the generated random number R2, the first information processing apparatus generates the encryption key K2 of the transmission mode for which the encryption key is not yet generated, of the encryption keys used for decrypting the data transmitted in the isochronous transmission mode and the second transmission mode, on the basis of the encryption key K1 of the transmission mode for which the encryption key is already generated, the received random number R2 and the generated random number S2, in the case where data Q'generated on the basis of the information indicating the validity of the apparatus itself, the received random number R1 and the generated random number S1 is coincident with the received data Q, the first information processing apparatus generates the encryption key K1 on the basis of the result of calculation of a unidirectional function using the information indicating the validity of the apparatus itself, the received random number R1 and the generated random number S1, and generates the encryption key K2 on the basis of the result of calculation of a unidirectional function using the generated encryption key K1, the received random number R2 and the generated random number S2, and the second information processing apparatus generates the encryption key K'1 on the basis of the result of calculation of a unidirectional function using the information indicating the validity of the apparatus itself, the received random number S1 and the generated random number R1, and generates the encryption key K'2 on the basis of the result of calculation of a unidirectional function using the generated encryption key K'1, the received random number S2 and the generated random number R2.

26. The information processing method as claimed in claim 25, wherein the first information processing apparatus transmits data P generated on the basis of the result of calculation of the unidirectional function using the generated encryption key K1, the received random number R2 and the generated random number S2 to the second information processing apparatus, the second information apparatus verifies whether or not data P' generated on the basis of the result of calculation of the unidirectional function using the generated encryption key K'1, the received random number S2 and the generated random number R2 is coincident with the received data P, and in the case where the data P' is coincident with the data P, transmits data Q generated on the basis of the result of calculation of the unidirectional function using the information indicating the validity of the apparatus itself, the received random number S1 and the generated random number R1 to the first information processing apparatus, and the first information processing apparatus generates the encryption key K2 in the case where data Q' generated on the basis of the result of calculation of the unidirectional function using the information indicating the validity of the apparatus itself, the received random number R1 and the generated random number S1 is coincident with the received data Q.

27. The information processing method as claimed in claim 25, wherein the first information processing apparatus and the second information processing apparatus generate the encryption key K1, the encryption key K2, the encryption key K'1 and the encryption key K'2, using a bit value of a part of the result of calculation of the unidirectional function.

28. The information processing method as claimed in claim 27, wherein the first information processing apparatus and the second information processing apparatus generate the data P, the data Q', the data Q and the data P', using a bit value of a part of the result of calculation of the unidirectional function.

29. The information processing method as claimed in claim 27, wherein the first information processing apparatus and the second information processing apparatus generate the encryption key K1, the encryption key K2, the encryption key K'1 and the encryption key K'2, using the least significant n bits of the result of calculation of the unidirectional function.

30. The information processing method as claimed in claim 29, wherein the first information processing apparatus and the second information processing apparatus generate the data P, the data Q', the data Q and the data P', using the most significant m bits of the result of calculation of the unidirectional function.

31. An information processing method for performing data transmission between a first information processing apparatus and a second information processing apparatus via an interface having an isochronous transmission mode in which a transmission band is ensured, the method comprising the steps of:

encrypting data from the first information processing apparatus using an encryption key, the encryption key being formed based on a first random number generated by the first information processing apparatus and a second random number generated by the second information processing apparatus, the second random number being different from the first random number, and then transmitting the encrypted data in the isochronous transmission mode; and decrypting, using the encryption key on the side of the second information processing apparatus, the encrypted data which is received in the isochronous transmission mode, wherein the second information processing apparatus generates two random numbers and transmits them to the first information processing apparatus, the first information processing apparatus generates two random numbers and transmits them to the second information processing apparatus, the first information processing apparatus generates an encryption key used for encrypting the data to be transmitted in the isochronous transmission mode and an encryption key used for encrypting data to be transmitted in a second transmission mode on the basis of information indicating the validity of the apparatus itself, the generated random number and the received random number, the second information processing apparatus generates an encryption key used for decrypting the data transmitted in the isochronous transmission mode and an encryption key used for decrypting the data transmitted in the second transmission mode on the basis of information indicating the validity of the apparatus itself, the generated random number and the received random number, the first information processing apparatus and the second information processing apparatus generate either one of the encryption key used for encrypting the data to be transmitted in the isochronous transmission mode and the encryption key used for encrypting the data to be transmitted in the second transmission mode, on the basis of the information indicating the validity of the apparatus itself, the generated random number and the received random number, and generate the encryption key of the other transmission mode on the basis of the generated encryption key, the generated random number and the received random number, the first information processing apparatus generates either one of the encryption key used for encrypting the data to be transmitted in the isochronous transmission mode and the encryption key used for encrypting the data to be transmitted in the second transmission mode, on the basis of the information indicating the validity of the apparatus itself, the received random number and the generated random number, and transmits data P generated on the basis of the generated encryption key, the received random number and the generated random number to the second information processing apparatus, the second information processing apparatus generates either one of the encryption key used for decrypting the data transmitted in the isochronous transmission mode and the encryption key used for decrypting the data transmitted in the second transmission mode, on the basis of the information indicating the validity of the apparatus itself, the received random number and the generated random number, and verifies whether or not data P' generated on the basis of the generated encryption key, the received random number and the generated random number is coincident with the received data P, and in the case where the data P' is coincident with the data P, transmits data Q generated on the basis of the information indicating the validity of the apparatus itself, the received random number and the generated random number to the first information processing apparatus and generates the encryption key of the transmission mode for which the encryption key is not generated yet, of the encryption keys used for decrypting the data transmitted in the isochronous transmission mode and the second transmission mode, on the basis of the encryption key of the transmission mode for which the encryption key is already generated, the received random number and the generated random number, the first information processing apparatus generates the encryption key of the transmission mode for which the encryption key is not yet generated, of the encryption keys used for decrypting the data transmitted in the isochronous transmission mode and the second transmission mode, on the basis of the encryption key of the transmission mode for which the encryption key is already generated, the received random number and the generated random number, in the case where data Q' generated on the basis of the information indicating the validity of the apparatus itself, the received random number and the generated random number is coincident with the received data Q, the second information processing apparatus generates two random numbers R1 and R2 and transmits them to the first information processing apparatus, the first information processing apparatus generates two random numbers S1 and S2 and transmits them to the second information processing apparatus, the first information processing apparatus generates one encryption key K1 of the encryption key used for encrypting the data to be transmitted in the isochronous transmission mode and the encryption key used for encrypting the data to be transmitted in the second transmission mode, on the basis of the information indicating the validity of the apparatus itself, the received random number R1 and the generated random number S1, and transmits data P generated on the basis of the generated encryption key K1, the received random number R2 and the generated random number S2 to the second information processing apparatus, the second information processing apparatus generates one encryption key K'1 of the encryption key used for decrypting the data transmitted in the isochronous transmission mode and the encryption key used for decrypting the data transmitted in the second transmission mode, on the basis of the information indicating the validity of the apparatus itself, the received random number S1 and the generated random number R1, and verifies whether or not data P' generated on the basis of the generated encryption key K'1 the received random number S2 and the generated random number R2 is coincident with the received data P, and in the case where the data P' is coincident with the data P, transmits data Q generated on the basis of the information indicating the validity of the apparatus itself, the received random number S1 and the generated random number R1 to the first information processing apparatus and generates the encryption key K'2 of the transmission mode for which the encryption key is not generated yet, of the encryption keys used for decrypting the data transmitted in the isochronous transmission mode and the second transmission mode, on the basis of the encryption key K'1 of the transmission mode for which the encryption key is already generated, the received random number S2 and the generated random number R2, the first information processing apparatus generates the encryption key K2 of the transmission mode for which the encryption key is not yet generated, of the encryption keys used for decrypting the data transmitted in the isochronous transmission mode and the second transmission mode, on the basis of the encryption key K1 of the transmission mode for which the encryption key is already generated, the received random number R2 and the generated random number S2, in the case where data Q'generated on the basis of the information indicating the validity of the apparatus itself, the received random number R1 and the generated random number S1 is coincident with the received data Q, the first information processing apparatus generates the encryption key K1 on the basis of the result of calculation of a unidirectional function with respect to concatenated data formed by concatenating the information indicating the validity of the apparatus itself, the received random number R1 and the generated random number, and generates the encryption key K2 on the basis of the result of calculation of a unidirectional function with respect to concatenated data formed by concatenating the information indicating the generated encryption key K1, the received random number R2 and the generated random number S2, and the second information processing apparatus generates the encryption key K'1 on the basis of the result of calculation of a unidirectional function with respect to concatenated data formed by concatenating the information indicating the validity of the apparatus itself, the received random number S1 and the generated random number R1, and generates the encryption key K'2 on the basis of the result of calculation of a unidirectional function with respect to concatenated data formed by concatenating the generated encryption key K'1, the received random number S2 and the generated random number R2.

32. The information processing method as claimed in claim 31, wherein the first information processing apparatus transmits data P generated on the basis of the result of calculation of the unidirectional function with respect to concatenated data formed by concatenating the generated encryption key K1, the received random number R2 and the generated random number S2 to the second information processing apparatus, the second information apparatus verifies whether or not data P' generated on the basis of the result of calculation of the unidirectional function with respect to concatenated data formed by concatenating the generated encryption key K'1, the received random number S2 and the generated random number R2 is coincident with the received data P, and in the case where the data P' is coincident with the data P, transmits data Q generated on the basis of the result of calculation of the unidirectional function with respect to concatenated data formed by concatenating the information indicating the validity of the apparatus itself, the received random number S1 and the generated random number R1 to the first information processing apparatus, and the first information processing apparatus generates the encryption key K2 in the case where data Q' generated on the basis of the result of calculation of the unidirectional function with respect to concatenated data formed by concatenating the information indicating the validity of the apparatus itself, the received random number R1 and the generated random number S1 is coincident with the received data Q.

33. A first information processing apparatus comprising:

an interface having an isochronous transmission mode; and a transmission control means for controlling encrypted transmissions from the apparatus, wherein data requiring the assurance of the transmission band is encrypted using an encryption key, the encryption key being formed based on a first random number generated by the first information processing apparatus and a second random number generated by a second information processing apparatus, the second random number being different from the first random number, and then the encrypted data is transmitted in the isochronous transmission mode via the interface, the transmission control means executes, prior to data transmission, a protocol for performing mutual authentication and sharing a plurality of encryption keys with the second information processing apparatus to which the encrypted data is to be transmitted, and from which an authentication request is to be received, the first information processing apparatus encrypts the data following said authentication request from the second information processing apparatus, the transmission control means generates two random numbers and transmits them to the second information processing apparatus, then receives two random numbers generated by the second information processing apparatus, and generates an encryption key used for encrypting the data to be transmitted in the isochronous transmission mode and an encryption key used for encrypting the data to be transmitted in the second transmission mode on the basis of information indicating the validity of the apparatus itself, the generated random number and the received random number, the transmission control means transmits data P generated on the basis of the information indicating the validity of the apparatus itself, the generated random number and the received random number, to the second information processing apparatus, then receives data Q generated by the second information processing apparatus on the basis of the information indicating the validity of the apparatus itself, the received random number and the generated random number, and generates an encryption key used for encrypting the data to be transmitted in the isochronous transmission mode and an encryption key used for encrypting the data to be transmitted in the second transmission mode in the case where data Q' generated on the basis of the information indicating the validity of the apparatus itself, the generated random number and the received random number is coincident with the received data Q, the transmission control means receives a random number R2 generated by the second information processing apparatus, generates two random numbers S1 and S2 and transmits them to the second information processing apparatus, transmits data P generated on the basis of information indicating the validity of the apparatus itself, the generated random number S2 and the received random number P2 to the second information processing apparatus, receives data Q generated by the second information processing apparatus on the basis of information indicating the validity of the apparatus itself, the received random number S1 and the generated random number R1, and generates an encryption key K1 used for encrypting the data to be transmitted in the isochronous transmission mode and an encryption key K2 used for encrypting the data to be transmitted in the second transmission mode in the case where data Q' generated on the basis of the information indicating the validity of the apparatus itself, the generated random number S1 and the received random number R1 is coincident with the received data Q, the transmission control means generates the encryption key K1 used for encrypting the data to be transmitted in the isochronous transmission mode, on the basis of the result of calculation of a unidirectional function using the information indicating the validity of the apparatus itself, the generated random number S1 and the received random number R1, and generates the encryption key K2 used for encrypting the data to be transmitted in the second transmission mode, on the basis of the result of calculation of a unidirectional function using the information indicating the validity of the apparatus itself, the generated random number S2 and the received random number R2.

34. The first information processing apparatus as claimed in claim 33, wherein the transmission control means transmits data P generated on the basis of the result of calculation of a unidirectional function using the information indicating the validity of the apparatus itself, the generated random number S2 and the received random number R2 to the second information processing apparatus, receives data Q generated by the second information processing apparatus on the basis of the result of calculation of a unidirectional function using the information indicating the validity of the apparatus itself, the received random number S1 and the generated random number R1, and generates the encryption key K1 used for encrypting the data to be transmitted in the isochronous transmission mode and the encryption key K2 used for encrypting the data to be transmitted in the second transmission mode in the case where data Q' generated on the basis of the result of calculation of a unidirectional function using the information indicating the validity of the apparatus itself, the generated random number S1 and the received random number R1 is coincident with the received data Q.

35. The first information processing apparatus as claimed in claim 33, wherein the transmission control means generates the encryption key K1 and the encryption key K2, using a bit value of a part of the result of calculation of the unidirectional function.

36. The first information processing apparatus as claimed in claim 35, wherein the transmission control means generates the data P and the data Q', using a bit value of a part of the result of calculation of the unidirectional function.

37. The first information processing apparatus as claimed in claim 35, wherein the transmission control means generates the encryption key K1 and the encryption key K2, using the least significant n bits of the result of calculation of the unidirectional function.

38. The first information processing apparatus as claimed in claim 37, wherein the transmission control means generates the data P and the data Q', using the most significant m bits of the result of calculation of the unidirectional function.

39. A first information processing apparatus comprising:

an interface having an isochronous transmission mode; and a transmission control means for controlling encrypted transmissions from the apparatus, wherein data requiring the assurance of the transmission band is encrypted using an encryption key, the encryption key being formed based on a first random number generated by the first information processing apparatus and a second random number generated by a second information processing apparatus, the second random number being different from the first random number, and then the encrypted data is transmitted in the isochronous transmission mode via the interface, the transmission control means executes, prior to data transmission, a protocol for performing mutual authentication and sharing a plurality of encryption keys with the second information processing apparatus to which the encrypted data is to be transmitted, and from which an authentication request is to be received, the first information processing apparatus encrypts the data following said authentication request from the second information processing apparatus, the transmission control means generates two random numbers and transmits them to the second information processing apparatus, then receives two random numbers generated by the second information processing apparatus, and generates an encryption key used for encrypting the data to be transmitted in the isochronous transmission mode and an encryption key used for encrypting the data to be transmitted in the second transmission mode on the basis of information indicating the validity of the apparatus itself, the generated random number and the received random number, the transmission control means transmits data P generated on the basis of the information indicating the validity of the apparatus itself, the generated random number and the received random number, to the second information processing apparatus, then receives data Q generated by the second information processing apparatus on the basis of the information indicating the validity of the apparatus itself, the received random number and the generated random number, and generates an encryption key used for encrypting the data to be transmitted in the isochronous transmission mode and an encryption key used for encrypting the data to be transmitted in the second transmission mode in the case where data Q' generated on the basis of the information indicating the validity of the apparatus itself, the generated random number and the received random number is coincident with the received data Q, the transmission control means receives a random number R2 generated by the second information processing apparatus, generates two random numbers S1 and S2 and transmits them to the second information processing apparatus, transmits data P generated on the basis of information indicating the validity of the apparatus itself, the generated random number S2 and the received random number P2 to the second information processing apparatus, receives data Q generated by the second information processing apparatus on the basis of information indicating the validity of the apparatus itself, the received random number S1 and the generated random number R1, and generates an encryption key K1 used for encrypting the data to be transmitted in the isochronous transmission mode and an encryption key K2 used for encrypting the data to be transmitted in the second transmission mode in the case where data Q' generated on the basis of the information indicating the validity of the apparatus itself, the generated random number S1 and the received random number R1 is coincident with the received data Q, the transmission control means generates the encryption key K1 used for encrypting the data to be transmitted in the isochronous transmission mode, on the basis of the result of calculation of a unidirectional function with respect to concatenated data formed by concatenating the information indicating the validity of the apparatus itself, the generated random number S1 and the received random number R1, and generates the encryption key K2 used for encrypting the data to be transmitted in the second transmission mode, on the basis of the result of calculation of a unidirectional function with respect to concatenated data formed by concatenating the information indicating the validity of the apparatus itself, the generated random number S2 and the received random number R2.

40. The first information processing apparatus as claimed in claim 39, wherein the transmission control means transmits data P generated on the basis of the result of calculation of a unidirectional function with respect to concatenated data formed by concatenating the information indicating the validity of the apparatus itself, the generated random number S2 and the received random number R2, to the second information processing apparatus, receives data Q generated by the second information processing apparatus on the basis of the result of calculation of a unidirectional function with respect to concatenated data formed by concatenating the information indicating the validity of the apparatus itself, the received random number S1 and the generated random number R1, and generates the encryption key K1 used for encrypting the data to be transmitted in the isochronous transmission mode and the encryption key K2 used for encrypting the data to be transmitted in the second transmission mode in the case where data Q' generated on the basis of the result of calculation of a unidirectional function with respect to concatenated data formed by concatenating the information indicating the validity of the apparatus itself, the generated random number S1 and the received random number R1 is coincident with the received data Q.

41. A first information processing apparatus comprising:

an interface having an isochronous transmission mode; and a transmission control means for controlling encrypted transmissions from the apparatus, wherein data requiring the assurance of the transmission band is encrypted using an encryption key, the encryption key being formed based on a first random number generated by the first information processing apparatus and a second random number generated by a second information processing apparatus, the second random number being different from the first random number, and then the encrypted data is transmitted in the isochronous transmission mode via the interface, the transmission control means executes, prior to data transmission, a protocol for performing mutual authentication and sharing a plurality of encryption keys with the second information processing apparatus to which the encrypted data is to be transmitted, and from which an authentication request is to be received, the first information processing apparatus encrypts the data following said authentication request from the second information processing apparatus, the transmission control means generates two random numbers and transmits them to the second information processing apparatus, then receives two random numbers generated by the second information processing apparatus, and generates an encryption key used for encrypting the data to be transmitted in the isochronous transmission mode and an encryption key used for encrypting the data to be transmitted in the second transmission mode on the basis of information indicating the validity of the apparatus itself, the generated random number and the received random number, the transmission control means generates either one of the encryption key used for encrypting the data to be transmitted in the isochronous transmission mode and the encryption key used for encrypting the data to be transmitted in the second transmission mode, on the basis of the information indicating the validity of the apparatus itself, the generated random number and the received random number, and generates the encryption key of the other transmission mode on the basis of the generated encryption key, the generated random number and the received random number, the transmission control means generates either one of the encryption key used for encrypting the data to be transmitted in the isochronous transmission mode and the encryption key used for encrypting the data to be transmitted in the second transmission mode, on the basis of the information indicating the validity of the apparatus itself, the received random number and the generated random number, transmits data P generated on the basis of the generated encryption key, the received random number and the generated random number to the second information processing apparatus, receives data Q generated by the second information processing apparatus on the basis of the information indicating the validity of the apparatus itself, the received random number and the generated random number, and generates the encryption key of the transmission mode for which the encryption key is not yet generated, of the encryption keys used for decrypting the data transmitted in the isochronous transmission mode and the second transmission mode, on the basis of the encryption key of the transmission mode for which the encryption key is already generated, the received random number and the generated random number, in the case where data Q'generated on the basis of the information indicating the validity of the apparatus itself, the received random number and the generated random number is coincident with the received data Q, the transmission control means receives two random numbers R1 and P2 generated by the second information processing apparatus, generates two random numbers S1 and S2 and transmits them to the second information processing apparatus, generates one encryption key K1 of the encryption key used for encrypting the data to be transmitted in the isochronous transmission mode and the encryption key used for encrypting the data to be transmitted in the second transmission mode, on the basis of the information indicating the validity of the apparatus itself, the received random number R1 and the generated random number S1, transmits data P generated on the basis of the generated encryption key K1, the received random number R2 and the generated random number S2 to the second information processing apparatus, receives data Q generated by the second information processing apparatus on the basis of the information indicating the validity of the apparatus itself, the received random number S1 and the generated random number R1, and generates the encryption key K2 of the transmission mode for which the encryption key is not yet generated, of the encryption keys used for decrypting the data transmitted in the isochronous transmission mode and the second transmission mode, on the basis of the encryption key K1 of the transmission mode for which the encryption key is already generated, the received random number R2 and the generated random number S2, in the case where data Q' generated on the basis of the information indicating the validity of the apparatus itself, the received random number R2 and the generated random number S2 is coincident with the received data Q, the transmission control means generates the encryption key K1 on the basis of the result of calculation of a unidirectional function using the information indicating the validity of the apparatus itself, the received random number R1 and the generated random number S1, and generates the encryption key K2 on the basis of the result of calculation of a unidirectional function using the generated encryption key K1, the received random number R2 and the generated random number S2.

42. The first information processing apparatus as claimed in claim 41, wherein the transmission control means transmits data P generated on the basis of the result of calculation of the unidirectional function using the generated encryption key K1, the received random number R2 and the generated random number S2 to the second information processing apparatus, receives data Q generated by the other information processing apparatus on the basis of the result of calculation of the unidirectional function using the information indicating the validity of the apparatus itself, the received random number S1 and the generated random number R1, and generates the encryption key K2 in the case where data Q' generated on the basis of the result of calculation of the unidirectional function using the information indicating the validity of the apparatus itself, the received random number R1 and the generated random number S1 is coincident with the received data Q.

43. The first information processing apparatus as claimed in claim 41, wherein the transmission control means generates the encryption key K1 and the encryption key K2, using a bit value of a part of the result of calculation of the unidirectional function.

44. The first information processing apparatus as claimed in claim 43, wherein the transmission control means generates the data P and the data Q', using a bit value of a part of the result of calculation of the unidirectional function.

45. The first information processing apparatus as claimed in claim 43, wherein the transmission control means generates the encryption key K1 and the encryption key K2, using the least significant n bits of the result of calculation of the unidirectional function.

46. The first information processing apparatus as claimed in claim 45, wherein the transmission control means generates the data P and the data Q', using the most significant m bits of the result of calculation of the unidirectional function.

47. The first information processing apparatus as claimed in claim 41, wherein the transmission control means generates the encryption key K1 on the basis of the result of calculation of a unidirectional function with respect to concatenated data formed by concatenating the information indicating the validity of the apparatus itself, the received random number R1 and the generated random number, and generates the encryption key K2 on the basis of the result of calculation of a unidirectional function with respect to concatenated data formed by concatenating the information indicating the generated encryption key K1, the received random number R1 and the generated random number S2.

48. The first information processing apparatus as claimed in claim 47, wherein the transmission control means transmits data P generated on the basis of the result of calculation of the unidirectional function with respect to concatenated data formed by concatenating the generated encryption key K1, the received random number R2 and the generated random number S2 to the second information processing apparatus, receives data Q generated by the second information processing apparatus on the basis of the result of calculation of the unidirectional function with respect to concatenated data formed by concatenating the information indicating the validity of the apparatus itself, the received random number S1 and the generated random number R1, and generates the encryption key K2 in the case where data Q' generated on the basis of the result of calculation of the unidirectional function with respect to concatenated data formed by concatenating the information indicating the validity of the apparatus itself, the received random number R1 and the generated random number S1 is coincident with the received data Q.

49. A first information processing apparatus comprising:

an interface having an isochronous transmission mode in which a transmission band is ensured; and a receiving control means for controlling reception of encrypted data received by the apparatus from a second information processing apparatus, wherein the encrypted data which is received in the isochronous transmission mode via the interface is decrypted by an encryption key, the encryption key being formed based on a first random number generated by the first information processing apparatus and a second random number generated by the second information processing apparatus, the second random number being different from the first random number, the receiving control means executes, prior to data reception, a protocol for performing mutual authentication and sharing a plurality of encryption keys with the second information processing apparatus from which the encrypted data is to be received, and to which an authentication request is to be transmitted, and the first information processing apparatus decrypts the encrypted data following said authentication request to the second information processing apparatus, the receiving control means generates two random numbers and transmits them to the second information processing apparatus, receives two random numbers generated by the second information processing apparatus, and generates an encryption key used for decrypting the data transmitted in the isochronous transmission mode and an encryption key used for decrypting the data transmitted in the second transmission mode on the basis of information indicating the validity of the apparatus itself, the generated random number and the received random number, the receiving control means receives data P generated by the second information processing apparatus on the basis of the information indicating the validity of the apparatus itself, the generated random number and the received random number, transmits data Q generated on the basis of the information indicating the validity of the apparatus itself, the generated random number and the received random number to the second information processing apparatus, and generates an encryption key used for decrypting the data transmitted in the isochronous transmission mode and an encryption key used for decrypting the data transmitted in the second transmission mode in the case where data P generated on the basis of the information indicating the validity of the apparatus itself, the generated random number and the received random number is coincident with the received data P, the receiving control means generates two random numbers R1 and R2 and transmits them to the second information processing apparatus, receives two random numbers S1 and S2 generated by the second information processing apparatus, receives data P generated by the second information processing apparatus on the basis of information indicating the validity of the apparatus itself, the generated random number S2 and the received random number R2, transmits data Q generated on the basis of information indicating the validity of the apparatus itself, the received random number S1 and the generated random number R1 to the second information processing apparatus, and generates an encryption key K'1 used for decrypting the data transmitted in the isochronous transmission mode and an encryption key K'2 used for decrypting the data transmitted in the second transmission mode in the case where data P' generated on the basis of the information indicating the validity of the apparatus itself, the received random number S2 and the generated random number R2 is coincident with the received data P, and the receiving control means generates the encryption key K'1 used for decrypting the data transmitted in the isochronous transmission mode, on the basis of the result of calculation of a unidirectional function using the information indicating the validity of the apparatus itself, the received random number S1 and the generated random number R1, and generates the encryption key K'2 used for decrypting the data transmitted in the second transmission mode, on the basis of the result of calculation of a unidirectional function using the information indicating the validity of the apparatus itself, the received random number S2 and the generated random number R2.

50. The first information processing apparatus as claimed in claim 49, wherein the receiving control means receives data P generated by the second information processing apparatus on the basis of the result of calculation of a unidirectional function using the information indicating the validity of the apparatus itself, the generated random number S2 and the received random number R2, transmits data Q generated on the basis of the result of calculation of a unidirectional function using the information indicating the validity of the apparatus itself, the received random number S1 and the generated random number R1 to the second information processing apparatus, and generates the encryption key K'1 used for decrypting the data transmitted in the isochronous transmission mode and the encryption key K'2 used for decrypting the data transmitted in the second transmission mode in the case where data P' generated on the basis of the result of calculation of a unidirectional function using the information indicating the validity of the apparatus itself, the received random number S2 and the generated random number R2 is coincident with the received data P.

51. The first information processing apparatus as claimed in claim 49, wherein the receiving control means generates the encryption key K'1 and the encryption key K'2, using a bit value of a part of the result of calculation of the unidirectional function.

52. The first information processing apparatus as claimed in claim 51, wherein the receiving control means generates the data Q and the data P', using a bit value of a part of the result of calculation of the unidirectional function.

53. The first information processing apparatus as claimed in claim 51, wherein the receiving control means generates the encryption key K'1 and the encryption key K'2, using the least significant n bits of the result of calculation of the unidirectional function.

54. The first information processing apparatus as claimed in claim 53, wherein the receiving control means generates the data Q and the data P', using the most significant m bits of the result of calculation of the unidirectional function.

55. A first information processing apparatus comprising:

an interface having an isochronous transmission mode in which a transmission band is ensured; and a receiving control means for controlling reception of encrypted data received by the apparatus from a second information processing apparatus, wherein the encrypted data which is received in the isochronous transmission mode via the interface is decrypted by an encryption key, the encryption key being formed based on a first random number generated by the first information processing apparatus and a second random number generated by the second information processing apparatus, the second random number being different from the first random number, the receiving control means executes, prior to data reception, a protocol for performing mutual authentication and sharing a plurality of encryption keys with the second information processing apparatus from which the encrypted data is to be received, and to which an authentication request is to be transmitted, and the first information processing apparatus decrypts the encrypted data following said authentication request to the second information processing apparatus, the receiving control means generates two random numbers and transmits them to the second information processing apparatus, receives two random numbers generated by the second information processing apparatus, and generates an encryption key used for decrypting the data transmitted in the isochronous transmission mode and an encryption key used for decrypting the data transmitted in the second transmission mode on the basis of information indicating the validity of the apparatus itself, the generated random number and the received random number, the receiving control means receives data P generated by the second information processing apparatus on the basis of the information indicating the validity of the apparatus itself, the generated random number and the received random number, transmits data Q generated on the basis of the information indicating the validity of the apparatus itself, the generated random number and the received random number to the second information processing apparatus, and generates an encryption key used for decrypting the data transmitted in the isochronous transmission mode and an encryption key used for decrypting the data transmitted in the second transmission mode in the case where data P generated on the basis of the information indicating the validity of the apparatus itself, the generated random number and the received random number is coincident with the received data P, the receiving control means generates two random numbers R1 and R2 and transmits them to the second information processing apparatus, receives two random numbers S1 and S2 generated by the second information processing apparatus, receives data P generated by the second information processing apparatus on the basis of information indicating the validity of the apparatus itself, the generated random number S2 and the received random number R2, transmits data Q generated on the basis of information indicating the validity of the apparatus itself, the received random number S1 and the generated random number R1 to the second information processing apparatus, and generates an encryption key K'1 used for decrypting the data transmitted in the isochronous transmission mode and an encryption key K'2 used for decrypting the data transmitted in the second transmission mode in the case where data P' generated on the basis of the information indicating the validity of the apparatus itself, the received random number S2 and the generated random number R2 is coincident with the received data P, and the receiving control means generates the encryption key K'1 used for decrypting the data transmitted in the isochronous transmission mode, on the basis of the result of calculation of a unidirectional function with respect to concatenated data formed by concatenating the information indicating the validity of the apparatus itself, the received random number S1 and the generated random number R1, and generates the encryption key K'2 used for decrypting the data transmitted in the second transmission mode, on the basis of the result of calculation of a unidirectional function with respect to concatenated data formed by concatenating the information indicating the validity of the apparatus itself, the received random number S2 and the generated random number R1.

56. The first information processing apparatus as claimed in claim 55, wherein the receiving control means receives data P generated by the second information processing apparatus on the basis of the result of calculation of a unidirectional function with respect to concatenated data formed by concatenating the information indicating the validity of the apparatus itself, the generated random number S2 and the received random number R1, transmits data Q generated on the basis of the result of calculation of a unidirectional function with respect to concatenated data formed by concatenating the information indicating the validity of the apparatus itself, the received random number S1 and the generated random number R1 to the second information processing apparatus, and generates the encryption key K'1 used for decrypting the data transmitted in the isochronous transmission mode and the encryption key K'2 used for decrypting the data transmitted in the second transmission mode in the case where data P' generated on the basis of the result of calculation of a unidirectional function with respect to concatenated data formed by concatenating the information indicating the validity of the apparatus itself, the received random number S2 and the generated random number R2 is coincident with the received data P.

57. A first information processing apparatus comprising:

an interface having an isochronous transmission mode in which a transmission band is ensured; and a receiving control means for controlling reception of encrypted data received by the apparatus from a second information processing apparatus, wherein the encrypted data which is received in the isochronous transmission mode via the interface is decrypted by an encryption key, the encryption key being formed based on a first random number generated by the first information processing apparatus and a second random number generated by the second information processing apparatus, the second random number being different from the first random number, the receiving control means executes, prior to data reception, a protocol for performing mutual authentication and sharing a plurality of encryption keys with the second information processing apparatus from which the encrypted data is to be received, and to which an authentication request is to be transmitted, and the first information processing apparatus decrypts the encrypted data following said authentication request to the second information processing apparatus the receiving control means generates two random numbers and transmits them to the second information processing apparatus, receives two random numbers generated by the second information processing apparatus, and generates an encryption key used for decrypting the data transmitted in the isochronous transmission mode and an encryption key used for decrypting the data transmitted in the second transmission mode on the basis of information indicating the validity of the apparatus itself, the generated random number and the received random number, the receiving control means generates either one of the encryption key used for encrypting the data to be transmitted in the isochronous transmission mode and the encryption key used for encrypting the data to be transmitted in the second transmission mode, on the basis of the information indicating the validity of the apparatus itself, the received random number and the generated random number, receives data P generated by the second information processing apparatus on the basis of the generated encryption key, the received random number and the generated random number, generates either one of the encryption key used for decrypting the data transmitted in the isochronous transmission mode and the encryption key used for decrypting the data transmitted in the second transmission mode, on the basis of the information indicating the validity of the apparatus itself, the received random number and the generated random number, verifies whether or not data P, generated on the basis of the generated encryption key, the received random number and the generated random number is coincident with the received data P, and in the case where the data P' is coincident with the data P, transmits data Q generated on the basis of the information indicating the validity of the apparatus itself, the received random number and the generated random number to the second information processing apparatus and generates the encryption key of the transmission mode for which the encryption key is not generated yet, of the encryption keys used for decrypting the data transmitted in the isochronous transmission mode and the second transmission mode, on the basis of the encryption key of the transmission mode for which the encryption key is already generated, the received random number and the generated random number, the receiving control means generates two random numbers R1 and R2 and transmits them to the second information processing apparatus, receives two random numbers S1 and S2 generated by the second information processing apparatus, the second information processing apparatus generating one encryption key K1 of the encryption key used for encrypting the data to be transmitted in the isochronous transmission mode and the encryption key used for encrypting the data to be transmitted in the second transmission mode on the basis of the information indicating the validity of the apparatus itself, the received random number R1 and the generated random number S1, the receiving control means receives data P generated on the basis of the generated encryption key K1, the received random number R2 and the generated random number S2, generates one encryption key K'1 of the encryption key used for decrypting the data transmitted in the isochronous transmission mode and the encryption key used for decrypting the data transmitted in the second transmission mode on the basis of the information indicating the validity of the apparatus itself, the received random number S1 and the generated random number R1, verifies whether or not data P' generated on the basis of the generated encryption key K'1, the received random number S2 and the generated random number R2 is coincident with the received data P, and in the case where the data P' is coincident with the data P, transmits data Q generated on the basis of the information indicating the validity of the apparatus itself, the received random number S1 and the generated random number R1 to the second information processing apparatus and generates the encryption key K'2 of the transmission mode for which the encryption key is not generated yet, of the encryption keys used for decrypting the data transmitted in the isochronous transmission mode and the second transmission mode, on the basis of the encryption key K'1 of the transmission mode for which the encryption key is already generated, the received random number S2 and the generated random number R2, and the receiving control means generates the encryption key K'1 on the basis of the result of calculation of a unidirectional function using the information indicating the validity of the apparatus itself, the received random number S1 and the generated random number R1, and generates the encryption key K'2 on the basis of the result of calculation of a unidirectional function using the generated encryption key K'1, the received random number S2 and the generated random number R2.

58. The first information processing apparatus as claimed in claim 57, wherein the receiving control means receives data P generated by the second information processing apparatus on the basis of the result of calculation of the unidirectional function using the generated encryption key K1, the received random number R2 and the generated random number S2, verifies whether or not data P'generated on the basis of the result of calculation of the unidirectional function using the generated encryption key K'1, the received random number S2 and the generated random number R2 is coincident with the received data P, and in the case where the data P' is coincident with the data P, transmits data Q generated on the basis of the result of calculation of the unidirectional function using the information indicating the validity of the apparatus itself, the received random number S1 and the generated random number R1 to the second information processing apparatus.

59. The first information processing apparatus as claimed in claim 57, wherein the receiving control means generates the encryption key K'1 and the encryption key K'2, using a bit value of a part of the result of calculation of the unidirectional function.

60. The first information processing apparatus as claimed in claim 59, wherein the receiving control means generates the data Q and the data P', using a bit value of a part of the result of calculation of the unidirectional function.

61. The first information processing apparatus as claimed in claim 59, wherein the receiving control means generates the encryption key K'1 and the encryption key K'2, using the least significant n bits of the result of calculation of the unidirectional function.

62. The first information processing apparatus as claimed in claim 61, wherein the receiving control means generates the data Q and the data P' using the most significant m bits of the result of calculation of the unidirectional function.

63. A first information processing apparatus comprising:

an interface having an isochronous transmission mode in which a transmission band is ensured; and a receiving control means for controlling reception of encrypted data received by the apparatus from a second information processing apparatus, wherein the encrypted data which is received in the isochronous transmission mode via the interface is decrypted by an encryption key, the encryption key being formed based on a first random number generated by the first information processing apparatus and a second random number generated by the second information processing apparatus, the second random number being different from the first random number, the receiving control means executes, prior to data reception, a protocol for performing mutual authentication and sharing a plurality of encryption keys with the second information processing apparatus from which the encrypted data is to be received, and to which an authentication request is to be transmitted, and the first information processing apparatus decrypts the encrypted data following said authentication request to the second information processing apparatus the receiving control means generates two random numbers and transmits them to the second information processing apparatus, receives two random numbers generated by the second information processing apparatus, and generates an encryption key used for decrypting the data transmitted in the isochronous transmission mode and an encryption key used for decrypting the data transmitted in the second transmission mode on the basis of information indicating the validity of the apparatus itself, the generated random number and the received random number, the receiving control means generates either one of the encryption key used for encrypting the data to be transmitted in the isochronous transmission mode and the encryption key used for encrypting the data to be transmitted in the second transmission mode, on the basis of the information indicating the validity of the apparatus itself, the received random number and the generated random number, receives data P generated by the second information processing apparatus on the basis of the generated encryption key, the received random number and the generated random number, generates either one of the encryption key used for decrypting the data transmitted in the isochronous transmission mode and the encryption key used for decrypting the data transmitted in the second transmission mode, on the basis of the information indicating the validity of the apparatus itself, the received random number and the generated random number, verifies whether or not data P' generated on the basis of the generated encryption key, the received random number and the generated random number is coincident with the received data P, and in the case where the data P' is coincident with the data P, transmits data Q generated on the basis of the information indicating the validity of the apparatus itself, the received random number and the generated random number to the second information processing apparatus and generates the encryption key of the transmission mode for which the encryption key is not generated yet, of the encryption keys used for decrypting the data transmitted in the isochronous transmission mode and the second transmission mode, on the basis of the encryption key of the transmission mode for which the encryption key is already generated, the received random number and the generated random number, the receiving control means generates two random numbers R1 and R2 and transmits them to the second information processing apparatus, receives two random numbers S1 and S2 generated by the second information processing apparatus, the second information processing apparatus generating one encryption key K1 of the encryption key used for encrypting the data to be transmitted in the isochronous transmission mode and the encryption key used for encrypting the data to be transmitted in the second transmission mode on the basis of the information indicating the validity of the apparatus itself, the received random number R1 and the generated random number S1, the receiving control means receives data P generated on the basis of the generated encryption key K1, the received random number R2 and the generated random number S2, generates one encryption key K'1 of the encryption key used for decrypting the data transmitted in the isochronous transmission mode and the encryption key used for decrypting the data transmitted in the second transmission mode on the basis of the information indicating the validity of the apparatus itself, the received random number S1 and the generated random number R1, verifies whether or not data P' generated on the basis of the generated encryption key K'1, the received random number S2 and the generated random number R2 is coincident with the received data P, and in the case where the data P' is coincident with the data P, transmits data Q generated on the basis of the information indicating the validity of the apparatus itself, the received random number S1 and the generated random number R1 to the second information processing apparatus and generates the encryption key K'2 of the transmission mode for which the encryption key is not generated yet, of the encryption keys used for decrypting the data transmitted in the isochronous transmission mode and the second transmission mode, on the basis of the encryption key K'1 of the transmission mode for which the encryption key is already generated, the received random number S2 and the generated random number R2, and the receiving control means generates the encryption key K'1 on the basis of the result of calculation of a unidirectional function with respect to concatenated data formed by concatenating the information indicating the validity of the apparatus itself, the received random number S1 and the generated random number R1, and generates the encryption key K'2 on the basis of the result of calculation of a unidirectional function with respect to concatenated data formed by concatenating the generated encryption key K'1, the received random number S2 and the generated random number R2.

64. The first information processing apparatus as claimed in claim 63, wherein the receiving control means receives data P generated by the second information processing apparatus on the basis of the result of calculation of the unidirectional function with respect to concatenated data formed by concatenating the generated encryption key K1, the received random number R2 and the generated random number S2, verifies whether or not data P' generated on the basis of the result of calculation of the unidirectional function with respect to concatenated data formed by concatenating the generated encryption key K'1, the received random number S2 and the generated random number R2 is coincident with the received data P, and in the case where the data P' is coincident with the data P, transmits data Q generated on the basis of the result of calculation of the unidirectional function with respect to concatenated data formed by concatenating the information indicating the validity of the apparatus itself, the received random number S1 and the generated random number R1 to the second information processing apparatus.

* * * * *

UNITED STATES PATENT AND TRADEMARK OFFICE

CERTIFICATE OF CORRECTION

PATENT NO. : 7,260,719 B1
APPLICATION NO. : 09/719460
DATED : August 21, 2007
INVENTOR(S) : Tomoyuki Asano et al.

It is certified that error appears in the above-identified patent and that said Letters Patent is hereby corrected as shown below:

In claim 1, column 22, line 13, “m the” should read --in the--.

In claim 7, column 25, line 31, “m the” should read --in the--.

In claim 9, column 29, line 22, “Q'generated” should read --Q' generated--.

In claim 15, column 33, line 13, “Q'generated” should read --Q' generated--.

In claim 25, column 41, line 57, “Q'generated” should read --Q' generated--.

In claim 31, line 45, line 21, “Q'generated” should read --Q' generated--.

In claim 41, column 50, line 49, “Q'generated” should read --Q' generated--.

In claim 58, column 57, line 57, “P'generated” should read --P' generated--.

Signed and Sealed this

Eighteenth Day of December, 2007

JON W. DUDAS
*Director of the United States Patent and Trademark Office*